United States Patent
Blackwell et al.

(10) Patent No.: US 12,065,598 B2
(45) Date of Patent: *Aug. 20, 2024

(54) FILMS WITH ENHANCED SCUFF RESISTANCE, CLARITY, AND CONFORMABILITY

(71) Applicant: Avery Dennison Corporation, Mentor, OH (US)

(72) Inventors: Christopher J. Blackwell, Garrettsville, OH (US); Sara E. Porosky, Stow, OH (US)

(73) Assignee: Avery Dennison Corporation, Mentor, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/815,603

(22) Filed: Jul. 28, 2022

(65) Prior Publication Data

US 2022/0363952 A1    Nov. 17, 2022

Related U.S. Application Data

(63) Continuation of application No. 14/728,264, filed on Jun. 2, 2015, now Pat. No. 11,459,488.

(Continued)

(51) Int. Cl.
*C09J 7/29* (2018.01)
*B32B 7/00* (2019.01)
(Continued)

(52) U.S. Cl.
CPC .............. *C09J 7/29* (2018.01); *B32B 7/00* (2013.01); *B32B 27/30* (2013.01); *B32B 27/306* (2013.01); *B32B 27/308* (2013.01); *B32B 27/32* (2013.01); *C08L 23/06* (2013.01); *C08L 23/08* (2013.01); *C08L 23/12* (2013.01); *C08L 23/14* (2013.01); *C09J 7/22* (2018.01); *C09J 7/243* (2018.01);
(Continued)

(58) Field of Classification Search
None
See application file for complete search history.

(56) References Cited

U.S. PATENT DOCUMENTS 3,113,986 A   12/1963   Breslow et al.
3,207,735 A   9/1965    Wijga
(Continued)

FOREIGN PATENT DOCUMENTS

CN   1086488   5/1994
CN   1112782   11/1995
(Continued)

OTHER PUBLICATIONS

"Blown Film Calculations," ExxonMobil, dated Apr. 14, 2015, 8 pages.

(Continued)

*Primary Examiner* — Frank D Ducheneaux

(57) ABSTRACT

Compositions which are well suited for forming into machine direction orientation (MDO) films are described. Multilayer films containing one or more layers of the compositions and/or films are also described. Additionally, label assemblies utilizing the multilayer films, labeled substrates, and related methods are described. Various versions of the multilayer films are described including films having at least two skin layers and an interior core layer. Particular multilayer films are described having polyethylene rich cores.

36 Claims, 3 Drawing Sheets

Related U.S. Application Data

(60) Provisional application No. 62/006,447, filed on Jun. 2, 2014.

(51) Int. Cl.

| | |
|---|---|
| *B32B 27/30* | (2006.01) |
| *B32B 27/32* | (2006.01) |
| *C08L 23/06* | (2006.01) |
| *C08L 23/08* | (2006.01) |
| *C08L 23/12* | (2006.01) |
| *C08L 23/14* | (2006.01) |
| *C09J 7/22* | (2018.01) |
| *C09J 7/24* | (2018.01) |
| *C09J 7/38* | (2018.01) |
| *G09F 3/10* | (2006.01) |
| *G09F 3/02* | (2006.01) |

(52) U.S. Cl.
CPC .................. *C09J 7/38* (2018.01); *G09F 3/10* (2013.01); *B32B 2250/40* (2013.01); *B32B 2307/514* (2013.01); *B32B 2307/516* (2013.01); *B32B 2519/00* (2013.01); *C09J 2203/334* (2013.01); *C09J 2301/122* (2020.08); *C09J 2301/162* (2020.08); *C09J 2301/302* (2020.08); *C09J 2423/046* (2013.01); *C09J 2423/106* (2013.01); *G09F 2003/0241* (2013.01); *G09F 2003/0257* (2013.01); *Y10T 428/28* (2015.01); *Y10T 428/2848* (2015.01); *Y10T 428/31913* (2015.04)

(56) References Cited

U.S. PATENT DOCUMENTS

| | | |
|---|---|---|
| 3,207,736 A | 9/1965 | Wijga |
| 3,207,737 A | 9/1965 | Wales |
| 3,207,738 A | 9/1965 | Wijga |
| 3,207,739 A | 9/1965 | Wales |
| 3,251,905 A | 5/1966 | Zelinski et al. |
| 3,268,627 A | 8/1966 | Emrick |
| 3,390,207 A | 6/1968 | Moss et al. |
| 3,598,887 A | 8/1971 | Darcy et al. |
| 3,639,521 A | 2/1972 | Hsieh |
| 3,853,595 A | 12/1974 | Pedginski |
| 3,887,745 A | 6/1975 | Yoshii |
| 3,894,904 A | 7/1975 | Cook |
| 3,963,851 A | 6/1976 | Toyoda |
| 4,016,118 A | 4/1977 | Hamada et al. |
| 4,020,141 A | 4/1977 | Quinn et al. |
| 4,059,667 A | 11/1977 | Pangonis |
| 4,124,677 A | 11/1978 | Saijo et al. |
| 4,188,350 A | 2/1980 | Vicik et al. |
| 4,205,021 A | 5/1980 | Morita et al. |
| 4,207,363 A | 6/1980 | Lustig et al. |
| 4,208,356 A | 6/1980 | Fukawa et al. |
| 4,219,627 A | 8/1980 | Halasa et al. |
| 4,226,952 A | 10/1980 | Halasa et al. |
| 4,314,039 A | 2/1982 | Kawai et al. |
| 4,327,009 A | 4/1982 | Allen et al. |
| 4,340,640 A | 7/1982 | Weiner |
| 4,371,645 A | 2/1983 | Mahaffey, Jr. |
| 4,399,180 A | 8/1983 | Briggs et al. |
| 4,399,181 A | 8/1983 | Yoshimura et al. |
| 4,405,667 A | 9/1983 | Christensen et al. |
| 4,407,873 A | 10/1983 | Christensen et al. |
| 4,407,874 A | 10/1983 | Gehrke |
| 4,430,377 A | 2/1984 | Yoshimura et al. |
| 4,434,264 A | 2/1984 | Ficker |
| 4,447,485 A | 5/1984 | Aritake |
| 4,451,533 A | 5/1984 | Wong |
| 4,463,113 A | 7/1984 | Nakahara et al. |
| 4,508,872 A | 4/1985 | McCollough, Jr. |
| 4,514,534 A | 4/1985 | DiNardo |
| 4,522,887 A | 6/1985 | Koebisu et al. |
| 4,525,416 A | 6/1985 | Hammerschmidt |
| 4,532,280 A | 7/1985 | Kobayashi et al. |
| 4,535,125 A | 8/1985 | McCullough, Jr. |
| 4,551,380 A | 11/1985 | Schoenberg |
| 4,565,559 A | 1/1986 | Wagner, Jr. et al. |
| 4,565,738 A | 1/1986 | Purdy |
| 4,578,316 A | 3/1986 | Clauson et al. |
| 4,578,429 A | 3/1986 | Gergen et al. |
| 4,581,262 A | 4/1986 | Karabedian |
| 4,585,679 A | 4/1986 | Karabedian |
| 4,588,775 A | 5/1986 | Mccullough, Jr. |
| 4,604,324 A | 8/1986 | Nahmias et al. |
| 4,605,576 A | 8/1986 | Jabarin |
| 4,613,547 A | 9/1986 | Wagner, Jr. et al. |
| 4,613,643 A | 9/1986 | Nakamura et al. |
| 4,616,470 A | 10/1986 | Nakamura |
| 4,621,119 A | 11/1986 | Lu |
| 4,626,574 A | 12/1986 | Cancio et al. |
| 4,634,735 A | 1/1987 | Thiersault et al. |
| 4,643,945 A | 2/1987 | Kiang |
| 4,657,970 A | 4/1987 | Shiraki et al. |
| 4,659,612 A | 4/1987 | Balloni et al. |
| 4,663,216 A | 5/1987 | Toyoda et al. |
| 4,684,578 A | 8/1987 | Inoue et al. |
| 4,692,489 A | 9/1987 | Ficker et al. |
| 4,695,503 A | 9/1987 | Liu et al. |
| 4,704,421 A | 11/1987 | Teskin |
| 4,713,273 A | 12/1987 | Freedman |
| 4,716,068 A | 12/1987 | Seifried |
| 4,720,427 A | 1/1988 | Clauson et al. |
| 4,724,185 A | 2/1988 | Shah |
| 4,728,377 A | 3/1988 | Gallagher |
| 4,735,335 A | 4/1988 | Torterotot |
| 4,748,206 A | 5/1988 | Nogiwa et al. |
| 4,752,597 A | 6/1988 | Turner |
| 4,769,284 A | 9/1988 | Kakugo et al. |
| 4,778,697 A | 10/1988 | Genske et al. |
| 4,790,436 A | 12/1988 | Nakamura |
| 4,795,782 A | 1/1989 | Lutz et al. |
| 4,797,235 A | 1/1989 | Garland et al. |
| 4,798,081 A | 1/1989 | Hazlitt et al. |
| 4,808,561 A | 2/1989 | Welborn, Jr. |
| 4,833,024 A | 5/1989 | Mueller |
| 4,843,129 A | 6/1989 | Spenadel et al. |
| 4,855,187 A | 8/1989 | Osgood, Jr. et al. |
| 4,865,908 A | 9/1989 | Liu et al. |
| 4,880,422 A | 11/1989 | McBride |
| 4,906,315 A | 3/1990 | McGrew |
| 4,913,858 A | 4/1990 | Miekka et al. |
| 4,933,120 A | 6/1990 | D'Amato et al. |
| 4,937,299 A | 6/1990 | Ewen et al. |
| 4,956,232 A | 9/1990 | Balloni et al. |
| 4,957,790 A | 9/1990 | Warren |
| 4,966,795 A | 10/1990 | Genske et al. |
| 4,988,465 A | 1/1991 | Lustig et al. |
| 5,003,915 A | 4/1991 | D'Amato et al. |
| 5,026,592 A | 6/1991 | Janocha et al. |
| 5,026,778 A | 6/1991 | Fujii et al. |
| 5,028,480 A | 7/1991 | Dean |
| 5,049,436 A | 9/1991 | Morgan et al. |
| 5,049,605 A | 9/1991 | Rekers |
| 5,068,155 A | 11/1991 | Yamada et al. |
| 5,077,129 A | 12/1991 | Schinkel |
| 5,083,850 A | 1/1992 | Mallik et al. |
| 5,084,558 A | 1/1992 | Rausch et al. |
| 5,085,816 A | 2/1992 | McCord |
| 5,089,352 A | 2/1992 | Garland et al. |
| 5,100,728 A | 3/1992 | Plamthottam et al. |
| 5,110,671 A | 5/1992 | Balloni |
| 5,116,548 A | 5/1992 | Mallik et al. |
| 5,125,529 A | 6/1992 | Torterotot |
| 5,135,800 A | 8/1992 | Nagaoka et al. |
| 5,145,212 A | 9/1992 | Mallik |
| 5,151,309 A | 9/1992 | Dollinger |
| 5,164,227 A | 11/1992 | Miekka et al. |
| 5,164,444 A | 11/1992 | Bernard |
| 5,175,054 A | 12/1992 | Chu |
| 5,186,782 A | 2/1993 | Freedman |

(56) References Cited

U.S. PATENT DOCUMENTS

| | | |
|---|---|---|
| 5,190,609 A | 3/1993 | Lin et al. |
| 5,194,324 A | 3/1993 | Poirier |
| 5,206,075 A | 4/1993 | Hodgson, Jr. |
| 5,212,246 A | 5/1993 | Ogale |
| 5,213,744 A | 5/1993 | Bossaert |
| 5,217,812 A | 6/1993 | Lee |
| 5,242,650 A | 9/1993 | Rackovan et al. |
| 5,250,631 A | 10/1993 | McCullough, Jr. |
| 5,252,384 A | 10/1993 | Bothe et al. |
| 5,254,393 A | 10/1993 | Murschall et al. |
| 5,254,394 A | 10/1993 | Bothe et al. |
| 5,272,236 A | 12/1993 | Lai et al. |
| 5,275,886 A | 1/1994 | Chu et al. |
| 5,278,272 A | 1/1994 | Lai et al. |
| 5,286,552 A | 2/1994 | Lesca et al. |
| 5,286,564 A | 2/1994 | Cecchin et al. |
| 5,288,548 A | 2/1994 | Weber |
| 5,292,561 A | 3/1994 | Peiffer et al. |
| 5,298,561 A | 3/1994 | Cecchin et al. |
| 5,300,365 A | 4/1994 | Ogale |
| 5,316,777 A | 5/1994 | Toyoda et al. |
| 5,326,639 A | 7/1994 | Leonard et al. |
| 5,331,047 A | 7/1994 | Giacobbe |
| 5,332,542 A | 7/1994 | Yamanaka et al. |
| 5,342,868 A | 8/1994 | Kimura et al. |
| 5,358,792 A | 10/1994 | Mehta et al. |
| 5,360,868 A | 11/1994 | Mosier et al. |
| 5,362,782 A | 11/1994 | McCullough, Jr. et al. |
| 5,376,417 A | 12/1994 | Amano et al. |
| 5,380,572 A | 1/1995 | Kotani et al. |
| 5,380,810 A | 1/1995 | Lai et al. |
| 5,382,631 A | 1/1995 | Stehling et al. |
| 5,395,471 A | 3/1995 | Obijeski et al. |
| 5,407,732 A | 4/1995 | Dokurno |
| 5,409,992 A | 4/1995 | Eppert, Jr. |
| 5,414,040 A | 5/1995 | McKay et al. |
| 5,424,362 A | 6/1995 | Hwang et al. |
| 5,425,990 A | 6/1995 | Blum |
| 5,427,807 A | 6/1995 | Chum et al. |
| 5,435,963 A | 7/1995 | Rackovan et al. |
| 5,451,283 A | 9/1995 | Josephy et al. |
| 5,451,455 A | 9/1995 | Peiffer et al. |
| 5,453,466 A | 9/1995 | Pellegatti et al. |
| 5,462,809 A | 10/1995 | Berkowitz |
| 5,464,690 A | 11/1995 | Boswell |
| 5,468,440 A | 11/1995 | McAlpin et al. |
| 5,468,535 A | 11/1995 | Amano et al. |
| 5,474,820 A | 12/1995 | Murschall et al. |
| 5,475,075 A | 12/1995 | Brant et al. |
| 5,476,914 A | 12/1995 | Ewen et al. |
| 5,482,766 A | 1/1996 | Mathavan et al. |
| 5,482,780 A | 1/1996 | Wilkie et al. |
| 5,491,019 A | 2/1996 | Kuo |
| 5,492,757 A | 2/1996 | Schuhmann et al. |
| 5,496,600 A | 3/1996 | Peiffer et al. |
| 5,501,905 A | 3/1996 | Krallmann |
| 5,503,923 A | 4/1996 | Goto et al. |
| 5,508,090 A | 4/1996 | Peiffer et al. |
| 5,516,563 A | 5/1996 | Schumann et al. |
| 5,518,790 A | 5/1996 | Huber et al. |
| 5,525,695 A | 6/1996 | Lai et al. |
| 5,527,601 A | 6/1996 | Crighton |
| 5,529,843 A | 6/1996 | Dries et al. |
| 5,530,054 A | 6/1996 | Tse et al. |
| 5,530,055 A | 6/1996 | Needham |
| 5,552,482 A | 9/1996 | Berta |
| 5,560,563 A | 10/1996 | Jenson, Jr. et al. |
| 5,560,885 A | 10/1996 | Murschall et al. |
| 5,560,997 A | 10/1996 | Kotani |
| 5,562,958 A | 10/1996 | Walton et al. |
| 5,573,723 A | 11/1996 | Peiffer et al. |
| 5,582,889 A | 12/1996 | Maurizio |
| 5,582,923 A | 12/1996 | Kale et al. |
| 5,585,193 A | 12/1996 | Josephy et al. |
| 5,591,390 A | 1/1997 | Walton et al. |
| 5,594,070 A | 1/1997 | Jacoby et al. |
| 5,595,705 A | 1/1997 | Walton et al. |
| 5,611,980 A | 3/1997 | Eto et al. |
| 5,611,982 A | 3/1997 | Hathavan et al. |
| 5,639,811 A | 6/1997 | Plamthottam et al. |
| 5,641,848 A | 6/1997 | Giacobbe et al. |
| 5,643,678 A | 7/1997 | Boswell |
| 5,662,985 A | 9/1997 | Jensen et al. |
| 5,665,800 A | 9/1997 | Lai et al. |
| 5,670,003 A | 9/1997 | Boswell |
| 5,672,224 A | 9/1997 | Kaufmann |
| 5,674,342 A | 10/1997 | Obijeski et al. |
| 5,674,580 A | 10/1997 | Boswell |
| 5,674,630 A | 10/1997 | Chatterjee |
| 5,677,383 A | 10/1997 | Chum et al. |
| 5,685,128 A | 11/1997 | Chum et al. |
| 5,691,043 A | 11/1997 | Keller et al. |
| 5,709,937 A | 1/1998 | Adams et al. |
| 5,711,839 A | 1/1998 | Dronzek et al. |
| 5,712,031 A | 1/1998 | Kelch et al. |
| 5,716,669 A | 2/1998 | LaRose et al. |
| 5,747,192 A | 5/1998 | Hughen et al. |
| 5,747,594 A | 5/1998 | deGroot et al. |
| 5,753,349 A | 5/1998 | Boswell |
| 5,756,169 A | 5/1998 | Peiffer et al. |
| 5,759,648 A | 6/1998 | Idias |
| 5,759,683 A | 6/1998 | Boswell |
| 5,773,155 A | 6/1998 | Kale et al. |
| 5,783,017 A | 7/1998 | Boswell |
| 5,783,638 A | 7/1998 | Lai et al. |
| 5,792,549 A | 8/1998 | Wilkie |
| 5,810,957 A | 9/1998 | Boswell |
| 5,844,045 A | 12/1998 | Kolthammer et al. |
| 5,847,053 A | 12/1998 | Chum et al. |
| 5,849,419 A | 12/1998 | Josephy et al. |
| 5,852,152 A | 12/1998 | Walton et al. |
| 5,863,665 A | 1/1999 | Kale et al. |
| 5,863,834 A | 1/1999 | Kawaguchi et al. |
| 5,869,575 A | 2/1999 | Kolthammer et al. |
| 5,874,139 A | 2/1999 | Bosiers et al. |
| 5,882,749 A | 3/1999 | Gregory et al. |
| 5,885,699 A | 3/1999 | Watson et al. |
| 5,885,707 A | 3/1999 | Kaschel et al. |
| 5,885,721 A | 3/1999 | Su |
| 5,897,941 A | 4/1999 | Shah |
| 5,900,294 A | 5/1999 | Murschall et al. |
| 5,900,310 A | 5/1999 | Murschall et al. |
| 5,907,942 A | 6/1999 | Eichnauer |
| 5,922,800 A | 7/1999 | Crotty et al. |
| 5,932,157 A | 8/1999 | Dries et al. |
| 5,948,199 A | 9/1999 | McGrew |
| 5,948,839 A | 9/1999 | Chatterjee |
| 5,955,205 A | 9/1999 | Ramsey et al. |
| 5,961,766 A | 10/1999 | Chang et al. |
| 5,962,092 A | 10/1999 | Kuo et al. |
| 5,972,443 A | 10/1999 | Breck et al. |
| 5,972,444 A | 10/1999 | Patel et al. |
| 5,986,009 A | 11/1999 | Thoen et al. |
| 5,986,028 A | 11/1999 | Lai et al. |
| 5,998,017 A | 12/1999 | Eichbauer et al. |
| 6,007,665 A | 12/1999 | Bourdelais et al. |
| 6,017,615 A | 1/2000 | Thakker et al. |
| 6,020,046 A | 2/2000 | Abhau |
| 6,026,953 A | 2/2000 | Nakamura et al. |
| 6,033,514 A | 3/2000 | Davis et al. |
| 6,042,930 A | 3/2000 | Kelch et al. |
| 6,051,305 A | 4/2000 | Hsu |
| 6,060,567 A | 5/2000 | Lai et al. |
| 6,072,005 A | 6/2000 | Kobylivker et al. |
| 6,074,762 A | 6/2000 | Cretekos et al. |
| 6,083,611 A | 7/2000 | Eichbauer et al. |
| 6,093,464 A | 7/2000 | Tokunaga et al. |
| 6,093,480 A | 7/2000 | Eichbauer |
| 6,094,889 A | 8/2000 | Van Loon et al. |
| 6,096,014 A | 8/2000 | Haffner et al. |
| 6,111,023 A | 8/2000 | Chum et al. |
| 6,111,102 A | 8/2000 | Schlegel |
| 6,113,271 A | 9/2000 | Scott |
| 6,127,043 A | 10/2000 | Lange |

(56) References Cited

U.S. PATENT DOCUMENTS

| | | |
|---|---|---|
| 6,136,439 A | 10/2000 | Coburn |
| 6,136,937 A | 10/2000 | Lai et al. |
| 6,140,442 A | 10/2000 | Knight et al. |
| 6,165,599 A | 12/2000 | Demeuse |
| 6,165,609 A | 12/2000 | Curatolo |
| 6,180,720 B1 | 1/2001 | Collina et al. |
| 6,183,856 B1 | 2/2001 | Amon |
| 6,194,532 B1 | 2/2001 | Maugans et al. |
| 6,197,886 B1 | 3/2001 | Chatterjee et al. |
| 6,204,330 B1 | 3/2001 | Braga et al. |
| 6,204,335 B1 | 3/2001 | Somers |
| 6,214,443 B1 | 4/2001 | Palmasi et al. |
| 6,214,447 B1 | 4/2001 | Nakagawa et al. |
| 6,214,935 B1 | 4/2001 | Sasaki et al. |
| 6,231,936 B1 | 5/2001 | Kozimor et al. |
| 6,231,975 B1 | 5/2001 | Kong et al. |
| 6,235,818 B1 | 5/2001 | Marizono et al. |
| 6,245,857 B1 | 6/2001 | Shamshoum et al. |
| 6,248,851 B1 | 6/2001 | Maugans et al. |
| 6,268,062 B1 | 7/2001 | Demeuse |
| 6,287,684 B1 | 9/2001 | Yamanaka et al. |
| 6,288,168 B1 | 9/2001 | Shiromoto et al. |
| 6,290,261 B1 | 9/2001 | Bryce et al. |
| 6,299,984 B1 | 10/2001 | Forloni |
| 6,300,415 B1 | 10/2001 | Okayama et al. |
| 6,300,419 B1 | 10/2001 | Sehanobish et al. |
| 6,303,233 B1 | 10/2001 | Amon et al. |
| 6,306,518 B1 | 10/2001 | Shah et al. |
| 6,316,549 B1 | 11/2001 | Chum et al. |
| 6,319,945 B1 | 11/2001 | Lee et al. |
| 6,322,883 B1 | 11/2001 | Williams |
| 6,329,454 B1 | 12/2001 | Krabbenborg |
| 6,333,096 B1 | 12/2001 | Rodgers et al. |
| 6,340,532 B1 | 1/2002 | Huang et al. |
| 6,342,564 B1 | 1/2002 | Pitkanen et al. |
| 6,342,566 B2 | 1/2002 | Burkhardt et al. |
| 6,344,250 B1 | 2/2002 | Arthurs |
| 6,348,555 B1 | 2/2002 | Lai et al. |
| 6,362,270 B1 | 3/2002 | Chaudhary et al. |
| 6,364,988 B1 | 4/2002 | Lin |
| 6,365,682 B1 | 4/2002 | Alastalo et al. |
| 6,368,545 B1 | 4/2002 | Bailey et al. |
| 6,376,058 B1 | 4/2002 | Schut et al. |
| 6,379,605 B1 | 4/2002 | Lin |
| 6,384,123 B1 | 5/2002 | Young |
| 6,384,138 B1 | 5/2002 | Jacob et al. |
| 6,384,142 B1 | 5/2002 | Burkhardt et al. |
| 6,387,529 B1 | 5/2002 | Peet |
| 6,391,425 B1 | 5/2002 | Migliorini et al. |
| 6,410,648 B1 | 6/2002 | Sasaki et al. |
| 6,423,420 B1 | 7/2002 | Brant et al. |
| 6,436,496 B1 | 8/2002 | Rackovan et al. |
| 6,436,531 B1 | 8/2002 | Kollaja et al. |
| 6,436,534 B1 | 8/2002 | Knight et al. |
| 6,440,533 B1 | 8/2002 | Ray et al. |
| 6,441,094 B1 | 8/2002 | Cecchin et al. |
| 6,444,301 B1 | 9/2002 | Davidson |
| 6,448,355 B1 | 9/2002 | Knight et al. |
| 6,451,426 B2 | 9/2002 | Kong et al. |
| 6,455,150 B1 | 9/2002 | Sheppard |
| 6,455,171 B2 | 9/2002 | Scheibelhoffer et al. |
| 6,455,643 B1 | 9/2002 | Harlin et al. |
| 6,461,555 B1 | 10/2002 | Freedman |
| 6,461,706 B1 | 10/2002 | Freedman et al. |
| 6,469,110 B1 | 10/2002 | Harlin et al. |
| 6,472,077 B1 | 10/2002 | Cretekos et al. |
| 6,472,474 B2 | 10/2002 | Burkhardt et al. |
| 6,486,284 B1 | 11/2002 | Karande et al. |
| 6,489,019 B1 | 12/2002 | Shah et al. |
| 6,495,266 B1 | 12/2002 | Migliorini |
| 6,500,563 B1 | 12/2002 | Datta et al. |
| 6,500,901 B2 | 12/2002 | Somers et al. |
| 6,503,619 B1 | 1/2003 | Neal et al. |
| 6,503,635 B1 | 1/2003 | Kong et al. |
| 6,503,637 B1 | 1/2003 | Van Loon |
| 6,506,867 B1 | 1/2003 | Lai et al. |
| 6,511,755 B1 | 1/2003 | Mochizuki et al. |
| 6,515,093 B1 | 2/2003 | Somers |
| 6,518,377 B1 | 2/2003 | Shamshoum |
| 6,534,612 B1 | 3/2003 | Lai et al. |
| 6,548,611 B2 | 4/2003 | Lai et al. |
| 6,552,149 B2 | 4/2003 | Alastalo et al. |
| 6,566,446 B1 | 5/2003 | Parikh et al. |
| 6,566,450 B2 | 5/2003 | Debras et al. |
| 6,576,306 B2 | 6/2003 | Mehta et al. |
| 6,576,329 B2 | 6/2003 | Kong |
| 6,583,209 B2 | 6/2003 | Mehta et al. |
| 6,583,227 B2 | 6/2003 | Mehta et al. |
| 6,610,792 B2 | 8/2003 | Albe et al. |
| 6,623,866 B2 | 9/2003 | Migliorini et al. |
| 6,638,637 B2 | 10/2003 | Hager et al. |
| 6,642,290 B1 | 11/2003 | Dotson |
| 6,663,947 B2 | 12/2003 | Freedman et al. |
| 6,703,134 B1 | 3/2004 | Parr et al. |
| 6,703,447 B2 | 3/2004 | Coburn |
| 6,706,342 B2 | 3/2004 | Kong et al. |
| 6,716,501 B2 | 4/2004 | Kovalchuk et al. |
| 6,723,829 B1 | 4/2004 | Malm et al. |
| 6,734,256 B1 | 5/2004 | Everaerts et al. |
| 6,765,068 B2 | 7/2004 | Albe et al. |
| 6,780,936 B1 | 8/2004 | Agarwal et al. |
| 6,787,217 B2 | 9/2004 | Squier et al. |
| 6,790,516 B2 | 9/2004 | Niepelt |
| 6,803,421 B2 | 10/2004 | Joseph |
| 6,808,822 B2 | 10/2004 | Rajan et al. |
| 6,821,592 B2 | 11/2004 | Rodick |
| 6,828,019 B2 | 12/2004 | Kong et al. |
| 6,835,462 B2 | 12/2004 | Sun et al. |
| 6,844,079 B2 | 1/2005 | Holzer |
| 6,872,462 B2 | 3/2005 | Roberts et al. |
| 6,881,793 B2 | 4/2005 | Sheldon et al. |
| 6,887,582 B2 | 5/2005 | Lee et al. |
| 6,908,687 B2 | 6/2005 | Mendes |
| 6,919,113 B2 | 7/2005 | Therrian et al. |
| 6,919,407 B2 | 7/2005 | Tau et al. |
| 6,939,602 B2 | 9/2005 | McGee et al. |
| 6,946,535 B2 | 9/2005 | Tau et al. |
| 6,982,311 B2 | 1/2006 | Karande et al. |
| 6,991,261 B2 | 1/2006 | Dronzek et al. |
| 6,994,915 B2 | 2/2006 | Pelliconi et al. |
| 6,995,213 B2 | 2/2006 | Miller et al. |
| 7,041,765 B2 | 5/2006 | Tau et al. |
| 7,165,888 B2 | 1/2007 | Ronald |
| 7,186,366 B2 | 3/2007 | Schwinn |
| 7,217,463 B2 | 5/2007 | Henderson |
| 7,217,767 B2 | 5/2007 | Aguirre et al. |
| 7,309,742 B2 | 12/2007 | Poncelet et al. |
| 7,410,706 B2 | 8/2008 | Rodick |
| 7,449,522 B2 | 11/2008 | Aguirre et al. |
| 7,655,317 B2 | 2/2010 | Brant et al. |
| 7,700,189 B2 | 4/2010 | Amon et al. |
| 7,722,960 B2 | 5/2010 | Mills et al. |
| 7,754,814 B2 | 7/2010 | Barcus et al. |
| 7,794,848 B2 | 9/2010 | Breese |
| 7,842,365 B2 | 11/2010 | Riggs |
| 7,927,712 B2 | 4/2011 | Mills et al. |
| 7,951,462 B2 | 5/2011 | English et al. |
| 7,963,413 B2 | 6/2011 | Gladys et al. |
| 8,012,558 B2 | 9/2011 | Behrens |
| 8,105,686 B2 | 1/2012 | Blackwell et al. |
| 8,181,783 B2 | 5/2012 | Kakura et al. |
| 8,182,891 B2 | 5/2012 | Scott et al. |
| 8,709,610 B2 | 4/2014 | Yun et al. |
| 2001/0018125 A1 | 8/2001 | Shibuya et al. |
| 2001/0029232 A1 | 10/2001 | Eisen et al. |
| 2001/0039314 A1 | 11/2001 | Mehta et al. |
| 2001/0041776 A1 | 11/2001 | Lai et al. |
| 2001/0044506 A1 | 11/2001 | Mehta et al. |
| 2001/0051265 A1 | 12/2001 | Williams et al. |
| 2001/0055692 A1 | 12/2001 | Heffelfinger et al. |
| 2002/0006498 A1 | 1/2002 | Migliorini et al. |
| 2002/0006520 A1 | 1/2002 | Rasp et al. |
| 2002/0028340 A1 | 3/2002 | Fujii et al. |
| 2002/0037969 A1 | 3/2002 | Schut |

(56) References Cited

U.S. PATENT DOCUMENTS

| | | |
|---|---|---|
| 2002/0050319 A1 | 5/2002 | Nishizawa |
| 2002/0064646 A1 | 5/2002 | Cretekos et al. |
| 2002/0065384 A1 | 5/2002 | Knight et al. |
| 2002/0098303 A1 | 7/2002 | Rackovan |
| 2002/0146520 A1 | 10/2002 | Squier |
| 2002/0155283 A1 | 10/2002 | Carter et al. |
| 2002/0160170 A1 | 10/2002 | Ishige et al. |
| 2002/0182390 A1 | 12/2002 | Migliorini |
| 2002/0192466 A1 | 12/2002 | Lu |
| 2003/0008082 A1 | 1/2003 | Dronzek et al. |
| 2003/0021930 A1 | 1/2003 | Mientus |
| 2003/0049436 A1 | 3/2003 | Hager et al. |
| 2003/0049476 A1 | 3/2003 | Su |
| 2003/0072957 A1 | 4/2003 | Lee et al. |
| 2003/0078357 A1 | 4/2003 | Lai et al. |
| 2003/0087114 A1 | 5/2003 | Ferri et al. |
| 2003/0099792 A1 | 5/2003 | Andersson et al. |
| 2003/0113535 A1 | 6/2003 | Sun et al. |
| 2003/0114579 A1 | 6/2003 | Mori et al. |
| 2003/0134062 A1 | 7/2003 | Rajan et al. |
| 2003/0143357 A1 | 7/2003 | Frauenhofer |
| 2003/0148132 A1 | 8/2003 | Schwinn |
| 2003/0157313 A1 | 8/2003 | Shibuya et al. |
| 2003/0176603 A1 | 9/2003 | Ommundsen et al. |
| 2003/0180490 A1 | 9/2003 | Squier |
| 2003/0203230 A1 | 10/2003 | Pellingra et al. |
| 2003/0207137 A1 | 11/2003 | Kong et al. |
| 2003/0207138 A1 | 11/2003 | Kong et al. |
| 2003/0211298 A1 | 11/2003 | Migliorini |
| 2004/0013870 A1 | 1/2004 | Sheldon et al. |
| 2004/0127614 A1 | 1/2004 | Jiang |
| 2004/0023052 A1 | 2/2004 | Ambroise |
| 2004/0033349 A1 | 2/2004 | Henderson |
| 2004/0050479 A1 | 3/2004 | McEwen et al. |
| 2004/0072004 A1 | 4/2004 | Migliorini |
| 2004/0081776 A1 | 4/2004 | Squier |
| 2004/0110019 A1 | 6/2004 | Schubert et al. |
| 2004/0126518 A1 | 7/2004 | Mendes et al. |
| 2004/0197572 A1 | 10/2004 | Bell |
| 2004/0224175 A1 | 11/2004 | Henderson |
| 2005/0031824 A1 | 2/2005 | Rodick |
| 2005/0037191 A1 | 2/2005 | Ikenoya |
| 2005/0042444 A1 | 2/2005 | Bohm et al. |
| 2005/0048303 A1 | 3/2005 | Henderson et al. |
| 2005/0069723 A1 | 3/2005 | Miller et al. |
| 2005/0113524 A1 | 5/2005 | Stevens |
| 2005/0129811 A1 | 6/2005 | Kraimer et al. |
| 2005/0142372 A1 | 6/2005 | Kitasaka et al. |
| 2005/0167026 A1 | 8/2005 | Dronzek et al. |
| 2005/0214558 A1 | 9/2005 | Rodick |
| 2005/0234172 A1 | 10/2005 | Musgrave |
| 2005/0276525 A1 | 12/2005 | Hebert |
| 2005/0287359 A1 | 12/2005 | Breese |
| 2006/0008666 A1 | 1/2006 | Miller et al. |
| 2006/0009586 A1 | 1/2006 | Aquirre et al. |
| 2006/0024518 A1 | 2/2006 | Kong et al. |
| 2006/0024520 A1 | 2/2006 | Kong et al. |
| 2006/0040100 A1 | 2/2006 | Nemoto et al. |
| 2006/0057410 A1 | 3/2006 | Saavedra et al. |
| 2006/0147663 A1 | 7/2006 | Barre et al. |
| 2006/0251342 A1 | 11/2006 | Josephine |
| 2006/0258811 A1 | 11/2006 | Barcus et al. |
| 2006/0293424 A1 | 12/2006 | Tse |
| 2007/0059545 A1 | 6/2007 | Emiliani et al. |
| 2007/0142801 A1 | 6/2007 | Zhou |
| 2008/0020191 A1 | 1/2008 | Mussig et al. |
| 2008/0134642 A1 | 6/2008 | Brown et al. |
| 2008/0199647 A1 | 8/2008 | Blackwell |
| 2008/0206505 A1 | 8/2008 | Blackwell et al. |
| 2009/0068486 A1 | 3/2009 | Blackwell et al. |
| 2009/0110944 A1 | 4/2009 | Aguirre et al. |
| 2009/0130360 A1 | 5/2009 | Damman et al. |
| 2009/0155614 A1 | 6/2009 | McLeod et al. |
| 2009/0220757 A1 | 9/2009 | Patel et al. |
| 2010/0002963 A1 | 1/2010 | Victor et al. |
| 2010/0055429 A1 | 3/2010 | Lee |
| 2010/0260989 A1 | 10/2010 | Grefenstein et al. |
| 2010/0300616 A1 | 12/2010 | Mitchell |
| 2010/0323134 A1 | 12/2010 | Bostian et al. |
| 2011/0039151 A1 | 2/2011 | Mitchell |
| 2011/0123743 A1 | 5/2011 | Tara et al. |
| 2011/0163100 A1 | 7/2011 | Ueda |
| 2011/0177326 A1 | 7/2011 | Mitchell |
| 2012/0040197 A1 | 2/2012 | Suzuki et al. |
| 2012/0060997 A1 | 3/2012 | Mitchell et al. |
| 2012/0189830 A1 | 7/2012 | Niepelt et al. |
| 2012/0196102 A1 | 8/2012 | Cortes |
| 2013/0192744 A1 | 8/2013 | Henderson |
| 2013/0320019 A1 | 12/2013 | Tinoco |
| 2014/0205847 A1 | 7/2014 | Falla |
| 2014/0248480 A1 | 9/2014 | Vinck et al. |
| 2015/0151885 A1 | 6/2015 | Nakano |
| 2015/0190988 A1 | 7/2015 | Saxberg et al. |
| 2015/0322250 A1 | 11/2015 | Katsuno et al. |

FOREIGN PATENT DOCUMENTS

| | | |
|---|---|---|
| CN | 1659030 | 8/2005 |
| CN | 1720170 | 1/2006 |
| CN | 101027373 | 8/2007 |
| CN | 101489786 | 7/2009 |
| CN | 1533342 | 9/2009 |
| CN | 102083619 | 6/2011 |
| CN | 102137797 | 7/2011 |
| CN | 101239666 | 12/2011 |
| CN | 102596567 | 7/2012 |
| CN | 101489787 | 12/2012 |
| CN | 101484315 | 4/2013 |
| CN | 101466543 | 3/2014 |
| CN | 102196907 | 3/2015 |
| CN | 109355023 | 2/2019 |
| DE | 3710670 | 10/1987 |
| DE | 10147538 | 4/2003 |
| EP | 0185454 | 11/1980 |
| EP | 0029368 | 5/1981 |
| EP | 0122495 | 5/1989 |
| EP | 0341091 | 11/1989 |
| EP | 0377289 | 7/1990 |
| EP | 0416379 | 8/1990 |
| EP | 0119314 | 6/1991 |
| EP | 0444671 | 9/1991 |
| EP | 0619827 | 6/1993 |
| EP | 0477662 | 2/1995 |
| EP | 0688007 | 12/1995 |
| EP | 0569621 | 1/1996 |
| EP | 0373660 | 2/1996 |
| EP | 0575465 | 4/1997 |
| EP | 0608369 | 5/1997 |
| EP | 0416815 | 8/1997 |
| EP | 0457082 | 11/1997 |
| EP | 0830248 | 3/1998 |
| EP | 0677832 | 6/1998 |
| EP | 0696300 | 12/1998 |
| EP | 0887381 | 12/1998 |
| EP | 0783006 | 1/1999 |
| EP | 0640649 | 3/1999 |
| EP | 0706448 | 7/1999 |
| EP | 0950511 | 10/1999 |
| EP | 0899278 | 11/1999 |
| EP | 0899279 | 11/1999 |
| EP | 0956947 | 11/1999 |
| EP | 0589213 | 1/2000 |
| EP | 0681592 | 8/2000 |
| EP | 0472946 | 10/2000 |
| EP | 0782589 | 6/2001 |
| EP | 1116745 | 7/2001 |
| EP | 1244743 | 10/2002 |
| EP | 1283242 | 2/2003 |
| EP | 0787167 | 5/2003 |
| EP | 0831994 | 8/2003 |
| EP | 0991679 | 11/2003 |
| EP | 1044995 | 11/2003 |
| EP | 0991719 | 12/2003 |
| EP | 1376516 | 1/2004 |

(56) References Cited

FOREIGN PATENT DOCUMENTS

| | | |
|---|---|---|
| EP | 0887380 | 2/2004 |
| EP | 1409360 | 4/2004 |
| EP | 0991684 | 1/2006 |
| EP | 1719712 | 11/2006 |
| EP | 1813423 | 8/2007 |
| EP | 0863183 | 5/2008 |
| EP | 1775122 | 7/2009 |
| EP | 1886934 | 6/2010 |
| EP | 2323921 | 4/2013 |
| GB | 1171219 | 10/1968 |
| JP | 52-126487 | 4/1976 |
| JP | 52-109580 | 9/1977 |
| JP | 54-130295 | 10/1979 |
| JP | 60-178132 | 9/1985 |
| JP | 62-056117 | 3/1987 |
| JP | 62-121709 | 6/1987 |
| JP | 64-9728 | 1/1989 |
| JP | 08-099353 | 4/1996 |
| JP | 8-504700 | 5/1996 |
| JP | 11-198310 | 7/1999 |
| JP | 2002-037311 | 2/2002 |
| JP | 2002-370328 | 12/2002 |
| JP | 2003-137314 | 5/2003 |
| JP | 2004-114610 | 4/2004 |
| JP | 2004-182310 | 7/2004 |
| JP | 2005-104149 | 4/2005 |
| JP | 2005-281599 | 10/2005 |
| JP | 2006-326890 | 12/2006 |
| JP | 2007-003975 | 1/2007 |
| JP | 2008-063004 | 3/2008 |
| JP | 2009-543941 | 12/2009 |
| JP | 2011-526867 | 10/2010 |
| WO | 90/00788 | 1/1990 |
| WO | 9003414 | 4/1990 |
| WO | 92/06836 | 4/1992 |
| WO | 93/03093 | 2/1993 |
| WO | 93/03695 | 3/1993 |
| WO | 93/10007 | 5/1993 |
| WO | 9313143 | 7/1993 |
| WO | 9409060 | 4/1994 |
| WO | 95/01397 | 1/1995 |
| WO | 95/26268 | 10/1995 |
| WO | 95/32242 | 11/1995 |
| WO | 96/21557 | 7/1996 |
| WO | 97/01440 | 1/1997 |
| WO | 97/08238 | 3/1997 |
| WO | 98/01285 | 1/1998 |
| WO | 98/59002 | 12/1998 |
| WO | 00/13888 | 3/2000 |
| WO | 00/58090 | 10/2000 |
| WO | 01/03922 | 1/2001 |
| WO | 01/17775 | 3/2001 |
| WO | 01/046314 | 6/2001 |
| WO | 01/70484 | 9/2001 |
| WO | 02/11983 | 2/2002 |
| WO | 02/084343 | 10/2002 |
| WO | 03/011584 | 2/2003 |
| WO | 03/014219 | 2/2003 |
| WO | 03/018312 | 3/2003 |
| WO | 03/033262 | 4/2003 |
| WO | 03/093003 | 11/2003 |
| WO | 03/093004 | 11/2003 |
| WO | 03/106514 | 12/2003 |
| WO | 2004/03874 | 1/2004 |
| WO | 2004/09348 | 1/2004 |
| WO | 2004/055101 | 7/2004 |
| WO | 2004/094129 | 11/2004 |
| WO | 2005/040270 | 5/2005 |
| WO | 2005/97492 | 10/2005 |
| WO | 2006/022973 | 3/2006 |
| WO | 2006/031435 | 3/2006 |
| WO | 06/43919 | 4/2006 |
| WO | 2006/062504 | 6/2006 |
| WO | 2007/085283 | 8/2007 |
| WO | 2007/146986 | 12/2007 |
| WO | 2007/149900 | 12/2007 |
| WO | 2008/011402 | 1/2008 |
| WO | 2010/002834 | 1/2010 |
| WO | 2010/067111 | 6/2010 |
| WO | 2011/100029 | 8/2011 |
| WO | 2011/113008 | 9/2011 |
| WO | 2011/128669 | 10/2011 |
| WO | 2012/106025 | 8/2012 |
| WO | 2013/125670 | 8/2013 |

OTHER PUBLICATIONS

"What types of Polymers are extruded into blown film?" posted Sep. 20, 2022, downloaded from https://www.linkedin.com/pulse/what-types-polymers-extruded-blown-film-du-nguyen/, 13 pages.
"K-Resin, TIB 204, Blown and Cast Film," Chevron Phillips Chemical Company LP, 2001, 16 pages.
International Search Report and Written Opinion issued in corresponding IA No. PCT/US2015/033707 dated Aug. 6, 2015.
International Preliminary Report on Patentability issued in corresponding IA No. PCT/US2015/033707 dated Dec. 15, 2016.
Brentwood Plastics, LLDPE linear low density polyethylene varieties, Jul. 26, 2012 <https://brentwoodplastics.com/blog/lldpe-linear-low-density-polyethylene> (Year: 20212).
M. Tanaka; High Value Added Film Using an Olefin Based Elastomer; Specialty Plastics Conference, Zuerich, Dec. 3-4, 1990.
TAFMER(R) "A"—A New Polyolefin Resin with Excellent Flexibility, Mitsui Petrochemical Industries, Jan. 1977 (Mitsui, 1977).
Webpage printout from www.polymersdatabase.com for LLDPE printed Jul. 29, 2003, copyright notice 2000, CRC Press, pp. 1-10 (10 pages).
NR. Dharmarajan and T.C. Yu, Modifying Polypropylene with a Metallocene Plastomer, Plastics Engineering, pp. 33-35, Aug. 1996 (3 pages).
Huntsman, product data sheet for P5M4K-046, May 2002 (1 page).
ExxonMobil Chemical, product data sheet for EXACT 4151, Oct. 15, 1999 (1 page).
Webpage printout from www.polymersdatabase.com for VLDPE printed Jul. 29, 2003, copyright notice 2000, CRC Press, pp. 1-4 (4 pages).
Webpage printout from www.polymersdatabase.com for LDPE printed Jul. 29, 2003, copyright notice 2000, CRC Press, pp. 1-9 (9 pages).
Webpage printout from www.polymersdatabase.com for MDPE printed Jul. 29, 2003, copyright notice 2000, CRC Press, pp. 1-5 (5 pages).
Webpage printout from www.polymersdatabase.com for Polyethylene, High Density printed Jul. 29, 2003, copyright notice 2000, CRC Press, pp. 1-13 (13 pages).
Webpage printout from www.polymersdatabase.com for Ultra High Molecular Weight PE printed Jul. 29, 2003, copyright notice 2000, CRC Press, pp. 1-6 (6 pages).
TAMFER(R) "P"—A New-Type Elastomer as Plastics Modifying Agent Supplied in Pellet Form, Mitsui Petrochemical Industries, Aug. 1975 (Mitsui, 1975).
"MDO Films: Lots of Promise, Big Challenges," Jan H. Schut, Plastics Technology, Feb. 2005.
"Applications and Advantages of Beta-Crystalline Polypropylene," Philip Jacoby, Society of Plastics Engineers, Plastics Research Online, 10/2417/spepro.005015, 3 pages, copyright 2013.
International Search Report and Written Opinion issued in corresponding IA No. PCT/US2007/071633 dated Dec. 14, 2007.
International Preliminary Report on Patentability issued in corresponding IA No. PCT/US2007/071633 dated Jan. 8, 2009.
Kissin, Yury, Alkene Polymerization Reactions with Transition Metal Catalysts, Mar. 2008.
International Preliminary Report on Patentability issued in corresponding IA No. PCT/CN2012/080154 dated Feb. 17, 2015.
International Search Report and Written Opinion issued in corresponding IA No. PCT/CN2012/080154 dated May 23, 2013.
International Preliminary Report on Patentability issued in corresponding IA No. PCT/US2013/024003 dated Aug. 14, 2014.
International Search Report issued in corresponding IA No. PCT/US2013/024003 dated Sep. 19, 2013.

(56) References Cited

OTHER PUBLICATIONS

Written Opinion mailed May 15, 2006 in corresponding International Application No. PCT/US03/20281.
International Preliminary Report on Patentability issued in corresponding IA No. PCT/US2007/071084 dated Jul. 22, 2008.
International Search Report and Written Opinion issued in corresponding IA No. PCT/US2007/071084 dated Oct. 24, 2007.

FILMS WITH ENHANCED SCUFF RESISTANCE, CLARITY, AND CONFORMABILITY

CROSS-REFERENCE TO RELATED APPLICATION

The present application is a continuation of U.S. patent application Ser. No. 14/728,264, filed on Jun. 2, 2015, and claims the benefit of U.S. Provisional Patent Application No. 62/006,447 filed on Jun. 2, 2014, both of which are incorporated herein by reference in entirety.

BACKGROUND

The present subject matter relates to machine direction orientation (MDO) films and compositions for forming such. The present subject matter also relates to the use of MDO films in decoration technology, labels, and labeling applications where an adhesive is or is not applied to the film, as well as in cases where an adhesive is applied directly to a substrate and indirectly to a film. In particular, the present subject matter relates to multilayer films having interior core layers having higher levels of polyethylene while unexpectedly retaining clarity and enhancing scuff resistance of MDO films having lower levels of polyethylene. Also contemplated are the effects of surface treatment of such films resulting in enhanced ink curing performance and cutting such films using laser die cutting technology.

It is well known that stretching a polymeric film when the film is in an amorphous state into an oriented state while heating, can impart a wide range of improved properties to the film. Such resulting films, often referred to as MDO (machine direction orientation) films, may exhibit improved stiffness, tensile strength, optics, gauge or thickness uniformity, and barrier properties. The use of MDO films can result in significant cost savings because of reduced amounts of raw materials, and improved performance. MDO films can be the result of a cast film process with machine direction orientation or a blown film process with subsequent machine direction orientation. The MDO process can be in line or offline and the layers of the film can combine within a die or outside of a die.

One of the most common methods of film manufacture is blown film (which may also be referred to as the tubular film) extrusion. The process involves extrusion of a plastic through a circular die, followed by "bubble-like" expansion. Manufacturing film by this process permits the ability to produce tubing (both flat and gusseted) in a single operation; regulation of film width and thickness by control of the volume of air in the bubble, the output of the extruder and the speed of the haul-off; elimination of end effects such as edge bead trim and non-uniform temperature that can result from flat die film extrusion; and biaxial orientation of the film (allowing increased uniformity of mechanical properties). Blown film extrusion can be used for the manufacture of co-extruded, multi-layer films for high barrier applications, including food packaging.

In one method of the process of blown film extrusion, plastic melt is extruded through an annular slit die, usually vertically, to form a thin walled tube. Air is introduced via a hole in the center of the die to blow up the tube like a balloon. Mounted on top of the die, a high-speed air ring blows onto the hot film to cool it. The tube of film then continues upwards, continually cooling, until it passes through nip rolls where the tube is flattened to create what is known as a "lay-flat" tube of film. This lay-flat or collapsed tube is then taken back down the extrusion tower via more rollers. On higher output lines, the air inside the bubble is also exchanged, a process known as internal bubble cooling. The lay-flat film is then either kept as such, or the edges of the lay-flat film are slit off to produce two flat film sheets and wound up onto reels. If kept as lay-flat film, the tube of film may be made into bags by sealing across the width of film and cutting or perforating to make each bag. This may be done either in line with the blown film process or at a later stage.

Typically, the expansion ratio between the die and blown tube of film would be 1.5 to 4 times the die diameter. The drawdown between the melt wall thickness and the cooled film thickness occurs in both radial and longitudinal directions and may be controlled by changing the volume of air inside the bubble and alternatively or additionally by altering the haul off speed. Such processing may provide a blown film with more consistent properties in each direction as compared to a traditional cast or extruded film which is drawn down along the extrusion direction only.

Alternatively, a double bubble process may be use for creating a film. In such a process, the orientation line works by the so-called "double-bubble process", i.e. the polymers are extruded through a circular die and then water-quenched to form a thick primary tube which is then re-heated up to a suitable temperature and blown to form the main bubble of thin film.

The non-contact simultaneous orientation is attributable to the air inflated during the start-up phase. This air allows the transversal orientation while the machine direction orientation is taken simultaneously thanks to the speed difference between the stretching nip roll and the tower nip roll. The bubble is cooled by air and then flattened; after the trimming of the edge, the two webs obtained rolled up in two reels.

By annealing the product produced on bi-orientation equipment, it is possible to obtain heat set film, including BOPP, BOPA, and BOPET. Full or partial annealing may be conducted as part of the production process or may be carried out subsequently at a later time.

Many MDO films are multilayer films and include at least one skin layer that is positioned adjacent to a core layer. Ethylene vinyl acetate (EVA) is commonly used in one or both layers in view of its properties of "squeezability" and printability.

However, due to increasing demand and costs of EVA and EVA-based materials, MDO films with EVA are expected to increase in price. Further, it may become difficult to obtain EVA or EVA-containing films due to increasing demand for such in fields such as the photovoltaic industry. This presents another difficulty in selecting MDO films with EVA.

Accordingly, a need exists for a film material that can be readily formed into an MDO film, which has a reduced EVA content, and yet which exhibits many if not all of the desirable properties of EVA-containing MDO films. It is also desirable to increase the use of polyethylene and avoid the trade-offs of higher conformability, but lower clarity. When used in a skin layer, generally the higher amount of polyethylene, the lower the scuff resistance in an MDO film.

SUMMARY

The difficulties and drawbacks associated with previously known films and their use are addressed in the present films, label assemblies, labeled articles, and related methods.

In one aspect, the present subject matter provides an oriented film including a layer comprising a first polymeric material selected from the group consisting of polyethylene (PE) homopolymer, alpha olefin, PE copolymer, and combinations thereof, and a polypropylene (PP) containing material selected from the group consisting of PP homopolymer, PP-containing copolymer, and combinations thereof. The amount of the first polymeric material can be greater than, less than, or equal to the amount of the PP containing material.

In another aspect, the present subject matter provides a label assembly comprising an oriented film including a layer having a first polymeric material selected from the group consisting of polyethylene (PE) homopolymer, alpha olefin, PE copolymer, and combinations thereof, and a polypropylene (PP) containing material selected from the group consisting of PP homopolymer, PP-containing copolymer, and combinations thereof. The amount of the first polymeric material can be greater than, less than, or equal to the amount of the PP containing material. The label assembly also comprises a layer of an adhesive.

In yet another aspect, the present subject matter provides a labeled article comprising an article defining a surface, and a label assembly including an oriented film having a layer comprising a first polymeric material selected from the group consisting of polyethylene (PE) homopolymer, alpha olefin, PE copolymer, and combinations thereof, and a polypropylene (PP) containing material selected from the group consisting of PP homopolymer, PP-containing copolymer, and combinations thereof. The amount of the first polymeric material can be greater than, less than, or equal to the amount of the PP containing material. The label assembly also includes a layer of an adhesive. The layer of the adhesive of the label assembly is in contact with the surface of the article and the label assembly is adhered to the article.

In still another aspect, the present subject matter provides a method of producing a labeled article. The method comprises providing an article having a surface to receive a label. The method also comprises providing a label assembly that includes an oriented film having a layer which include a first polymeric material selected from the group consisting of polyethylene (PE) homopolymer, alpha olefin, PE copolymer, and combinations thereof, and a polypropylene (PP) containing material selected from the group consisting of PP homopolymer, PP-containing copolymer, and combinations thereof. The amount of the first polymeric material can be greater than, less than, or equal to the amount of the PP containing material. The label assembly also includes a layer of an adhesive. The method also comprises adhering the layer of the adhesive of the label assembly to the surface of the article to thereby produce a labeled article.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
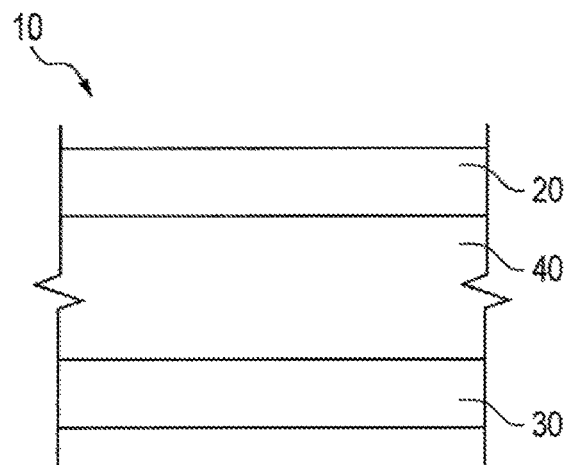
FIG. 1 is a schematic cross sectional view of an embodiment of a multilayer film in accordance with the present subject matter.

The present subject matter relates to an oriented film and particularly an MDO film having a core layer of a particular core composition. The MDO films generally include (i) at least one skin layer, and (ii) a core layer. In many embodiments of the present subject matter, the MDO films include two or more skin layers. Although many embodiments include a single core layer, the present subject matter includes the use of multiple core layers in a multilayer film. Embodiments may also include multiple layers of the same formula composition or alternatively may include a monolayer construction. The skin layer(s) can include one or more materials described herein or which are typically used in the art. The core layer includes a blend of a first polymeric material selected from the group consisting of polyethylene (PE), an alpha olefin, PE-copolymer and combinations thereof, as well as a polypropylene containing material selected from the group consisting of a PP homopolymer, a PP-containing copolymer, and combinations thereof. Alternatively or additionally, the PP containing material may also be a PP terpolymer. The amount of the first polymeric material can be greater than, less than, or equal to the amount of the PP-containing material. The core layer includes the blend or mixture as described above and optionally with one or more other components as described herein.

The present subject matter also relates to the use of these films in a wide range of applications such as pressure sensitive adhesive (PSA) labels and other packaging applications.

The polyethylene can be selected from linear low density polyethylene (LLDPE), low density polyethylene (LDPE), very low density polyethylene (VLDPE) (metallocene PE), high density polyethylene (HDPE), and combinations of these.

The PE-copolymer component can be in the form of various functionalized polyethylenes that have polar functionality in the polymer chain. Nonlimiting examples of such PE-containing components include: ethyl vinyl acetate (EVA), ethyl acrylic acid (EAA), ethyl methacrylic acid (EMA), ethylene terpolymers, anhydride modified ethylenes, ethyl acrylate (EA), ethylene copolymerized with carboxyl groups and a metal ion (Surlyn), and ethyl vinyl acetate with an acid or acrylate modifier. Combinations of PE-containing components could also be used.

The polypropylene can be nearly any suitable PP homopolymer.

The PP-containing component can be in the form of copolymers or terpolymers of polypropylene with another monomer or combination of monomers. It can also refer to heterophasic polypropylene or impact copolymers. These impact copolymers can have ethylene contents from ranges of 1% to 30%, or from 5% to 25% or from 10% to 18%. Such polypropylenes may be catalyzed by zieglar natta and metallocene catalysts.

For example, in certain embodiments, copolymers of PP and PE could be used having a low ethylene content or a high ethylene content. The term "low ethylene content" refers to an ethylene content of less than 3.5% and typically from 0.1% to 3.2%, based upon the PP-PE copolymer. The term "high ethylene content" refers to an ethylene content of at least 3.5% and typically from 5.5% to 7.5%, based upon the PP-PE copolymer. One can also contemplate ranges up to 10.5%. In certain embodiments, block copolymers of PP with one or more other monomers could be used. The PP-containing component could be in the form of PP with one or more functionalized polar groups such as maleic anhydride. The PP-containing component can also be in the form of terpolymers of PP. Combinations of PP-containing components could also be used.

For the alpha polyolefin component, this refers to the technologies of polypropylene and polyethylene using a catalyst that yield a copolymer of butene, hexane, or octene. Examples of the polyethylene type would be Dow Chemical Affinity EG 8200, Exxon Mobil Exact 4049, Exxon Mobil Exceed 3515CB, Nova Chemicals FPs-417-A, and Mitsui Chemicals Tafmer A and P series of products. The polypropylene type would be exemplified by Mitsui Chemicals Tafmer XM series and LyondellBasell DP8220M. There are also copolymers of ethylene and alpha olefins and propylene with alpha olefins. The film or core composition can also comprise additional components in addition to the blend of at least one of polyethylene (PE), and or an alpha olefin, and a PE-copolymer and at least one of polypropylene (PP) and a PP-containing copolymer. The amount of the at least one of the PE and the PE-containing component can be greater or less than or equal to the amount of the at least one of the PP and the PP-copolymer.

For example, the film or core composition can also comprise styrene-based components, nylons, nucleating agents, and a wide array of fillers and other agents described in greater detail herein.

For many embodiments, in the core layer, the amount of PE and/or PE-containing component is greater than or less than the amount of PP and/or PP-containing component. In particular versions of the present subject matter the core layer contains at least 9% of the PE and/or PE-containing component and up to about 89% of the PE and/or PE-containing component. In certain embodiments the core layer contains about 25% of the PE and/or PE-containing component. All references herein to amounts are weight amounts unless indicated otherwise. And, all references herein to percentages are weight percentages unless indicated otherwise.

In certain embodiments of multilayer films having multiple skin layers and at least one core layer, the skins can compositionally match the core (monolayer) or the skins can be compositionally different from the core (multilayer).

In certain embodiments, the one or more skin layers comprise polypropylene (PP), ethylene vinyl acetate (EVA), linear low density polyethylene (LLDPE), linear low density polypropylene (PP), high density polyethylene (HDPE), high density polypropylene (HDPP), styrene diblock copolymer, various ionomer resins such as those available from DuPont under the designation SURLYN®, linear low density polyethylene (LLDPE), very low density polyethylene (VLDPE), ethylene acrylic acid (EAA) copolymers, alpha olefins, and combinations thereof.

In many embodiments of multilayer films of the present subject matter, the weight proportion of the core layer is greater than the weight proportion of the skin layer or if multiple skin layers are used, greater than the total weight proportion of the skin layers. The weight proportions are based upon the total weight of the multilayer film. For example, in certain embodiments, the weight proportion of the core layer is 60% to 90% of the weight of the multilayer film. And the weight proportion of the one or more skin layers, e.g., two skin layers, is 10% to 40% of the weight of the multilayer film. In particular embodiments, the weight proportion of the core layer is about 70% and that of the skin layer(s) is about 30%.

In particular embodiments of multilayer films in which the PE content in the core is greater than currently available MDO films (some are 15% and others use 30%), the films of the present subject matter can achieve a better result without utilizing 80% PE in the core. Thus, in particular embodiments, the PE content in the core is from about 30% to 80% and in certain versions from 35% to 75%.

The core compositions comprise blends of the two components, (a) i.e., the PE and/or PE-containing component and (b) the PP and/or PP-containing component, which can be combined into a uniform mixture by melt blending in conventional equipment such as a Bandbury mill, extruder, or the like. Alternatively, the blends may be made by solution blending or by dry mixing the two components followed by melt fabrication of the dry mixture by extrusion.

The core and skin compositions of the present subject matter films may contain other additives to modify the properties of the respective composition. For example, colorants and mineral fillers may be included in the composition such as TiO2, CaCO3, talc, silica, mica, etc. The presence of small amounts of TiO2, for example, results in an opaque or white composition. Mineral fillers can be included in the compositions. Generally, the amounts of other additives range from about 1 to about 40% by weight, and more often from about 1% to about 20% by weight. Organic fillers are contemplated. Other additives which may be included in the compositions of the present subject matter include nucleation agents, clarifying agents, optical brighteners, metal particles, fibers, flame retardants, antioxidants, heat stabilizers, light stabilizers, ultraviolet light stabilizers, antiblocking agents, processing aids, etc.

Since two or more contacting layers of some of the films of the present subject matter may have a tendency to stick together or "block" (e.g., when the film is wound into a roll), antiblocking agents may be added to the compositions. Antiblocking agents are generally inorganic mineral fillers that reduce "sticking" by reducing the intimate contact between film layers. Antiblocking agents which may be included in the compositions of the present subject matter include mineral fillers such as diatomaceous earth, talc, calcium carbonate, crosslinked PMMA, silica and synthetic silica. Crosslinked PMMA and synthetic silica are the two most commonly used antiblocking agents.

In some embodiments of the present subject matter, the core composition may also contain one or more compatibilizers. In one embodiment, a compatibilizer may comprise a polyolefin copolymerized with or grafted to a polar reactant. For example, the compatibilizer may be an acrylic acid modified polypropylene graft copolymer (e.g., Polybond® 1003, BP chemicals), or a maleated polypropylene graft copolymer (e.g., Polybond® 3001 from BP Chemicals). In general, these compatibilizers may be referred to as carboxylated or maleated polyolefins.

The compositions of the present subject matter are thermoplastic compositions and are suitable for extrusion, blow molding, and in the preparation of various articles such as molded parts, extruded shapes, tubing, films, sheets, laminates, etc. Foams can be made from the compositions of the present subject matter by incorporating a blowing agent and other well-known additives such as particulate nucleating agents, and thereafter extruding the composition.

The compositions of the present subject matter are particularly useful in preparing continuous films which have desirable characteristics, particularly for label applications. The films are prepared by extrusion techniques known to those skilled in the art, and the films may range in thickness from about 0.5 to about 5, 7 or 10 mils. More often, the films will have a thickness of from about 1.2 to about 4 mils, and most often from about 2.0 to about 3.5 mils.

In many embodiments, it is preferred that the films prepared from the compositions are oriented in the machine direction. For example, the films may be hot-stretched in the machine direction at a ratio of at least 2:1. More often, the film will be hot stretched at a stretch ratio of between 2:1 and 9:1. Stretching may be performed by numerous techniques known in the art such as by a blown, cast, or tenter process. After the film has been hot stretched, it is generally passed over annealing rolls where the film is annealed or heat-set at temperatures in the range of from about 50% and more often 100° C. to about 150° C., followed by cooling. Such orientation provides the films with improved properties such as an increase in the stiffness of the film and in some instances, improved printability. Although not wishing to be bound by any theory, it is believed that the stretching causes changes in the surface polymer distribution and effective surface area resulting in enhanced printability. It is also believed that stretching temperature also has an effect on printability. Lower stretching temperatures generally produce a film having enhanced printability. The machine direction tensile modulus of the film also is increased by stretching, contributing to dimensional stability and good print registration. In certain embodiments the orientation in machine direction improves the die-cuttability of the films, and the dispensability of labels formed from the films. In some embodiments, abrasion or scuff resistance also is improved. As described in greater detail herein, MOO films of the present subject matter exhibit excellent printability and squeezability characteristics. Printability is typically measured by how much ink adheres to the film surface. As known in the industry, a label having properties enabling its use on squeezable containers such as certain shampoo or cosmetic containers, is often referred to as a "squeezable label." Generally, an indicator of a squeezable label is the conformability characteristics of the label. Label squeezability can be quantified by the modulus of the film. Generally, the lower the modulus of the film, the greater the squeezability of the film. In certain embodiments, the present subject matter films also exhibit excellent scratch resistance. Scratch resistance can be quantified by a Sutherland rub test as known in the art, and also by a hardness test. Generally, the harder the film, the more scratch resistant the film. These and other properties and characteristics of the present subject matter films are described in greater detail herein.

Although in many embodiments of the present subject matter, the films are oriented in one or more directions, it will be understood that in other embodiments, the films may not be oriented.

The films of the present subject matter may be monolayer films of the compositions of the present subject matter as described. Alternatively, the films of the present subject matter may be multilayer films wherein at least one of the layers such as a core layer includes the compositions of the present subject matter. Functional layers of polymeric films may be on one or both sides of the film. A functional layer or film is defined as one which is included to provide certain properties such as weatherability, printability, barrier layer, antistatic, etc. Such multilayer films may be prepared by coextrusion of two or more layers; by extrusion of a continuous film of the compositions of the present subject matter followed by the application of one or more additional layers on the extruded film by extrusion of one or more additional layers; by lamination of a preformed film of the subject matter to a preformed functional film; or by deposition of additional layers on the film from an emulsion or solution of a polymeric film forming material.

A functional film or layer can be included in the multilayer constructions of the subject matter to provide the film with additional and/or improved properties such as printability, squeezability, die-cuttability, weatherability, stiffness, abrasion resistance, etc. For example a transparent coating or film can be extruded on or laminated over printed indicia on the film to protect the print from damage caused by physical contact with adjacent objects, and damage caused by exposure to moisture, water or weather. The transparent coating can also enhance the optical qualities of the underlying printed indicia to provide a glossies and richer image. A functional film also can be included to improve the adhesion of the film to a substrate.

The added functional films are generally thin relative to the thickness of the core film, but thicker functional layers are also useful in some applications. The functional films are often referred to as skin layers, particularly when they are thinner than the core film. Alternatively, the films of the present subject matter can be used as a skin layer over a thicker base film (may be a multilayer film). The skin layer can be coextruded with the base film or laminated onto a preformed base film.

A wide variety of thermoplastic polymers can be utilized to form the functional films, and the particular thermoplastic polymer chosen is one which will provide the desired properties to the structure. Examples of useful materials include polystyrenes, polyethylene, polyamides, polyesters, polycarbonates, polyurethanes, polyacrylates, polyvinyl alcohol, poly (ethylene vinyl alcohol), polyvinyl acetates, ionomers, and mixtures thereof. Ethylene vinyl acetate copolymers are particularly useful for printable cover layers.

The films which can be prepared from the compositions of the present subject matter are useful, particularly, in the preparation of facestock and subsequently labelstock for use in preparing adhesive labels. Labelstock generally comprises the film facestock (which may be monolayer or multilayer) and an adhesive layer. The adhesive layer generally is in contact with and adhesively joined to one surface of the films of the present subject matter.

The adhesive layer utilized in the labelstocks of the present subject matter may be directly coated on the lower surface of the indicated layers, or the adhesive may be transferred from a liner with which the facestock is combined. Typically, the adhesive layer has a thickness of from about 0.4 to about 1.6 mils (10 to about 40 microns). Adhesives suitable for use in labelstocks of the present subject matter are commonly available in the art. Generally, these adhesives include pressure sensitive adhesives, heat-activated adhesives, hot melt adhesives, etc. Pressure sensitive adhesives (PSAs) are particularly useful. These include acrylic based adhesives as well as other elastomers such as natural rubber or synthetic rubber containing polymers or copolymers of styrene, butadiene, acrylonitrile, isoprene and isobutylene. PSAs are also well known in the art and any of the known adhesives can be used with the facestocks of the present subject matter. In one embodiment, the PSAs are based on copolymers of acrylic acid esters, such as, for example, 2-ethyl hexyl acrylate, with polar comonomers such as acrylic acid. Such adhesives may be emulsion based, hot melt based, or solvent based. The adhesives may be permanent, removable, or recyclable via water, caustic wash, or other solvents.

The other skin layer may also be printed onto the labelstock directly with inks, or a primer or topcoat may be applied to the labelstock and an ink printed on the topcoat. This print or topcoat layer can be the same or different in composition to the adhesive skin layer. Exemplary topcoats may be polyurethane, acrylic, or polyester based. Additionally, the adhesive or skin layer may be corona treated or flame treated. Alternatively or additionally, the skin layer may be metalized via vacuum metallization process.

As previously noted, the properties of the films and facestocks described herein can be improved in some instances, by laminating a film layer over the film of the present subject matter. The overlaminate layer can provide additional properties such stiffness and weatherability to the adhesive construction. The overlaminate layer can also provide a transparent coating or film over printed indicia to protect the print from damage caused by physical contact with adjacent objects, and damage caused by exposure to moisture, water, or weather. The transparent coating can also enhance the optical quantities of the underlying printed indicia to provide a glossier and richer image. The overlaminated constructions of the present subject matter are uniquely suited for use as labels on substrates subjected to subsequent liquid processing such as bottle washing/rinsing, filling and pasteurization, or liquid immersion (e.g., ice bath) without displaying adverse consequences such as label lifting or hazing.

The overlaminated film layer can be laminated to the film of the present subject matter by pressure when in the form of a continuous film having a layer of adhesive material interposed between the continuous polymer film of the adhesive structure and the overlaminate film layers. The overlaminated film layer can be laminated to the film by heat and pressure when either the film or the overlaminate film is formed from a material that when heat activated forms its own adhesive surface for lamination. Printing indicia can be disposed on the polypropylene film surface and/or on a backside surface of the overlaminate film layer.

FIG. 1 is a schematic cross sectional view of an embodiment of a multilayer film 10 in accordance with the present subject matter. The film 10 comprises a first skin layer 20, a second skin layer 30, and a core layer 40 disposed between the skin layers 20 and 30. In certain embodiments, the core layer 40 is disposed between and immediately adjacent to the skin layers 20 and 30, such as shown in FIG. 1. However, the present subject matter includes embodiments in which the core layer is not immediately adjacent to one or both skin layers, for example, if additional layer(s) are disposed therebetween.

Figure 2:
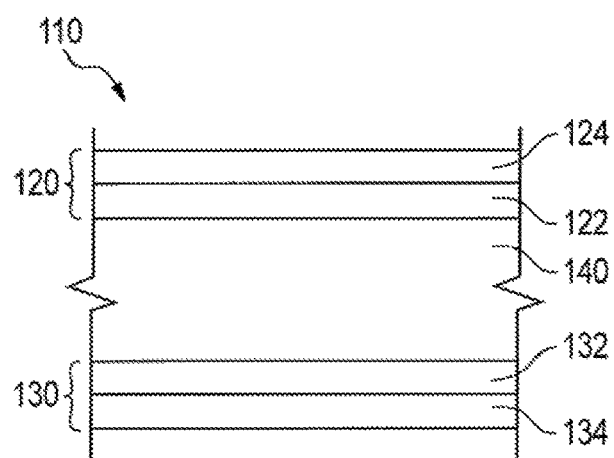
FIG. 2 is a schematic cross sectional view of another embodiment of a multilayer film in accordance with the present subject matter.

FIG. 2 is a schematic cross sectional view of another embodiment of a multilayer film 110 in accordance with the present subject matter. The film 110 comprises a first collection of skin layers 122 and 124 collectively designated as skin 120. The film 110 also comprises a second collection of skin layers 132 and 134 collectively designated as skin 130. The film 110 also comprises a core layer 140 disposed between the collections of skin layers 120 and 130.

Figure 3:
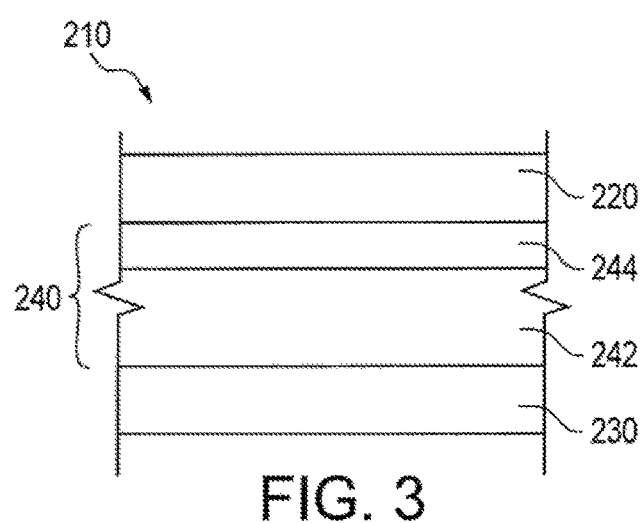
FIG. 3 is a schematic cross sectional view of another embodiment of a multilayer film in accordance with the present subject matter.

FIG. 3 is a schematic cross sectional view of another embodiment of a multilayer film 210 in accordance with the present subject matter. The film 210 comprises a first skin layer 220, a second skin layer 230, and a collection of core layers 242 and 244 collectively shown as 240, disposed between the skin layers 220 and 230.

Figure 4:
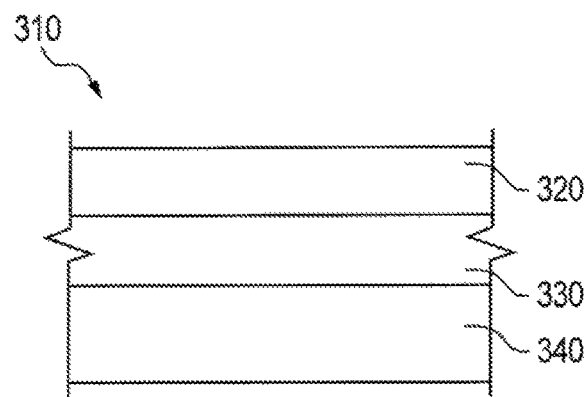
FIG. 4 is a schematic cross sectional view of another embodiment of a multilayer film in accordance with the present subject matter.

FIG. 4 is a schematic cross sectional view of another embodiment of a multilayer film 310 in accordance with the present subject matter. The film 310 comprises a first skin layer 320, a second skin layer 330, and a core layer 340 immediately adjacent to only one of the skin layers, i.e., the layer 330.

Figure 5:
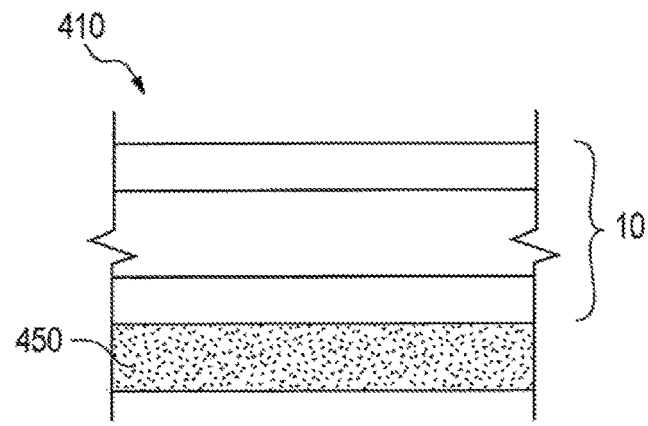
FIG. 5 is a schematic cross sectional view of a label assembly in accordance with the present subject matter.

FIG. 5 is a schematic cross sectional view of a label assembly 410 in accordance with the present subject matter. The label assembly 410 comprises a multilayer film which although shown as film 10 of FIG. 1, could be any of the films 110, 210, 310, or other film(s) described herein. The label assembly 410 also comprises an adhesive layer 450 adjacent to one of the layers of the film. Typically, the adhesive is a pressure sensitive adhesive but the present subject matter includes a wide array of other adhesives.

Figure 6:
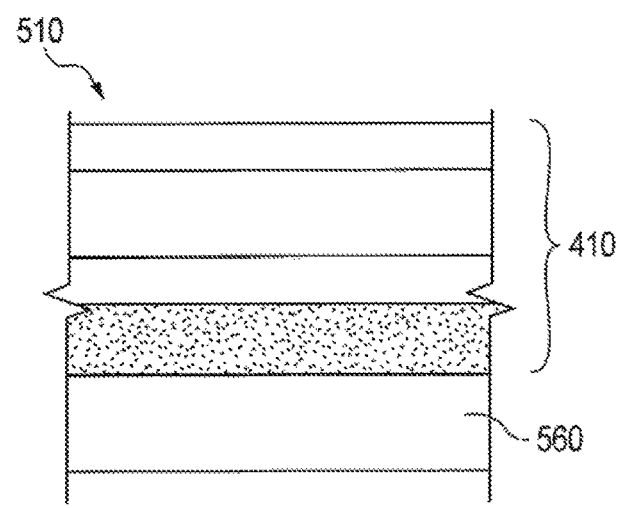
FIG. 6 is a schematic cross sectional view of the label assembly of FIG. 5 applied to a polymeric substrate in accordance with the present subject matter.

FIG. 6 is a schematic cross sectional view of the label assembly 410 of FIG. 5 applied to a polymeric substrate 560 to thereby form a labeled system 510 in accordance with the present subject matter.

Figure 7:
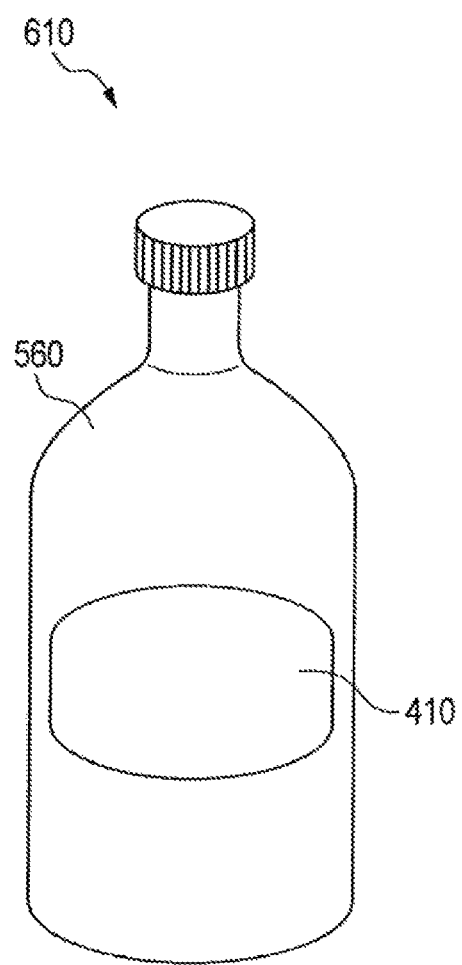
FIG. 7 is a schematic perspective view of a container having the label assembly of FIGS. 5 and 6 applied thereto.

FIG. 7 is a schematic perspective view of a labeled container 610 in accordance with the present subject matter. The labeled container 610 includes the label assembly 410 of FIGS. 5 and 6 applied to an outer surface of the substrate 560 which could for example be a sidewall of the container.

EXAMPLES

Various multilayer films in accordance with the present subject matter were prepared. Each multilayer film included a single core layer disposed between two skin layers. In some examples, the skin layers have the same composition, while in other examples the skin layers have differing composition. The weight proportion of the core was 70% and that of each skin layer was 15%. Table 1 summarizes the multilayer films having a skin-core-skin arrangement, and the composition of each layer.

TABLE 1

Multilayer Films of Examples 1-14

| Example | Layer | Composition |
|---|---|---|
| 1 | Skin 1 | 25% Flint Hills P4-050F 4.0 MFR Homopolymer polypropylene |
| | | 25% Dow Affinity EG 8200G 5.0 MI metallocene polyethylene |
| | | 25% Dow Dowlex 2517 25 MI LLDPE (zieglar natta) |
| | | 25% Celanese 1821A 3.0 MI EVA 18% VA content |
| | Core | 70% Flint Hills 43S2A 3.2% ethylene random copolymer 2.0 MFR |
| | | 30% Dow Dowlex 2517 25 MI LLDPE (zieglar natta) |

TABLE 1-continued

Multilayer Films of Examples 1-14

| Example | Layer | Composition |
|---|---|---|
| | Skin 2 | 25% Flint Hills P4-050F 4.0 MFR Homopolymer polypropylene<br>25% Dow Affinity EG 8200G 5.0 MI metallocene polyethylene<br>25% Dow Dowlex 2517 25 MI LLDPE (zieglar natta)<br>25% Celanese 1821A 3.0 MI EVA 18% VA content |
| 2 | Skin 1 | 50% Flint Hills P4-050F 4.0 MFR Homopolymer polypropylene<br>50% Celanese 1821A 3.0 MI EVA 18% VA content |
| | Core | 30% Flint Hills 43S2A 3.2% ethylene random copolymer 2.0 MFR<br>70% Dow Dowlex 2517 25 MI LLDPE (zieglar natta) |
| | Skin 2 | 50% Flint Hills P4-050F 4.0 MFR Homopolymer polypropylene<br>50% Celanese 1821A 3.0 MI EVA 18% VA content |
| 3 | Skin 1 | 34% Flint Hills P4-050F 4.0 MFR Homopolymer polypropylene<br>33% Dow Amplify EA 101 6.0 MI Ethyl Acrylate (18% EA content)<br>33% Dow Dowlex 2517 25 MI LLDPE (zieglar natta) |
| | Core | 40% Flint Hills 43S2A 3.2% ethylene random copolymer 2.0 MFR<br>15% Exxon Mobil LL3003.32 LLDPE 3.2 MI<br>15% Lyondell Basell Petrothene NA324009 3.0 MI<br>30% Flint Hills P4-050F 4.0 MFR Homopolymer polypropylene |
| | Skin 2 | 34% Flint Hills P4-050F 4.0 MFR Homopolymer polypropylene<br>33% Dow Amplify EA 101 6.0 MI Ethyl Acrylate (18% EA content)<br>33% Dow Dowlex 2517 25 MI LLDPE (zieglar natta) |
| 4 | Skin 1 | 30% Flint Hills P4-050F 4.0 MFR Homopolymer polypropylene<br>34% Westlake DA 528 Ethyl vinyl acetate (18.5% VA content). 2.5 MI<br>33% Dow Dowlex 2517 25 MI LLDPE (zieglar natta) |
| | Core | 70% Braskem DS6D81 5.7% ethylene random copolymer polypropylene 5.0 MFR<br>30% Dow Dowlex 2517 25 MI LLDPE (zieglar natta) |
| | Skin 2 | 30% Flint Hills P4-050F 4.0 MFR Homopolymer polypropylene<br>34% Westlake DA 528 Ethyl vinyl acetate (18.5% VA content). 2.5 MI<br>33% Dow Dowlex 2517 25 MI LLDPE (zieglar natta) |
| 5 | Skin 1 | 50% Flint Hills P4-050F 4.0 MFR Homopolymer polypropylene<br>10% Celanese 1821A 3.0 MI EVA 18% VA content<br>40% Kraton D114PX SIS 10 MI |
| | Core | 25% Flint Hills P4-050F 4.0 MFR Homopolymer polypropylene<br>75% Lyondell Basell Petrothene NA324009 3.0 MI |
| | Skin 2 | 50% Flint Hills P4-050F 4.0 MFR Homopolymer polypropylene<br>10% Celanese 1821A 3.0 MI EVA 18% VA content<br>40% Kraton D114PX SIS 10 MI |
| 6 | Skin 1 | 30% Flint Hills P4-050F 4.0 MFR Homopolymer polypropylene<br>50% Celanese 1821A 3.0 MI EVA 18% VA content<br>20% DuPont Surlyn 1802 4.3 MI |
| | Core | 25% Flint Hills P4-050F 4.0 MFR Homopolymer polypropylene<br>75% Lyondell Basell Petrothene NA324009 3.0 MI |
| | Skin 2 | 30% Flint Hills P4-050F 4.0 MFR Homopolymer polypropylene<br>50% Celanese 1821A 3.0 MI EVA 18% VA content<br>20% DuPont Surlyn 1802 4.3 MI |
| 7 | Skin 1 | 40% Flint Hills 43S2A 3.2% ethylene random copolymer 2.0 MFR<br>15% Exxon Mobil LL3003.32 LLDPE 3.2 MI<br>15% Lyondell Basell Petrothene NA324009 3.0 MI<br>30% Flint Hills P4-050F 4.0 MFR Homopolymer polypropylene |
| | Core | 40% Flint Hills 43S2A 3.2% ethylene random copolymer 2.0 MFR<br>15% Exxon Mobil LL3003.32 LLDPE 3.2 MI<br>15% Lyondell Basell Petrothene NA324009 3.0 MI<br>30% Flint Hills P4-050F 4.0 MFR Homopolymer polypropylene |
| | Skin 2 | 40% Flint Hills 43S2A 3.2% ethylene random copolymer 2.0 MFR<br>15% Exxon Mobil LL3003.32 LLDPE 3.2 MI<br>15% Lyondell Basell Petrothene NA324009 3.0 MI<br>30% Flint Hills P4-050F 4.0 MFR Homopolymer polypropylene |
| 8 | Skin 1 | 70% Braskem DS6D81 5.7% ethylene random copolymer 5.0 MFR<br>30% Exxon Mobil 3518CB metallocene polyethylene 3.5 MFR |
| | Core | 80% Braskem DS6D81 5.7% ethylene random copolymer 5.0 MFR<br>20% Exxon Mobil 3518CB metallocene polyethylene 3.5 MFR |
| | Skin 2 | 70% Braskem DS6D81 5.7% ethylene random copolymer 5.0 MFR<br>30% Exxon Mobil 3518CB metallocene polyethylene 3.5 MFR |
| 9 | Skin 1 | 85% Braskem DS6D81 5.7% ethylene random copolymer 5.0 MFR<br>15% Exxon Mobil 3518CB metallocene polyethylene 3.5 MFR |
| | Core | 33% Braskem DS6D81 5.7% ethylene random copolymer 5.0 MFR<br>34% Exxon Mobil 3518CB metallocene polyethylene 3.5 MFR<br>33% Flint Hills 43S2A 3.2% ethylene random copolymer 2.0 MFR |
| | Skin 2 | 50% Braskem DS6D81 5.7% ethylene random copolymer 5.0 MFR<br>50% Exxon Mobil 3518CB metallocene polyethylene 3.5 MFR |
| 10 | Skin 1 | 85% Braskem DS6D81 5.7% ethylene random copolymer 5.0 MFR<br>20% Flint Hills P4-050F 4.0 MFR Homopolymer polypropylene<br>15% Exxon Mobil 3518CB metallocene polyethylene 3.5 MFR |
| | Core | 33% Braskem DS6D81 5.7% ethylene random copolymer 5.0 MFR<br>34% Exxon Mobil 3518CB metallocene polyethylene 3.5 MFR<br>33% Flint Hills 43S2A 3.2% ethylene random copolymer 2.0 MFR |

TABLE 1-continued

Multilayer Films of Examples 1-14

| Example | Layer | Composition |
|---|---|---|
| | Skin 2 | 50% Braskem DS6D81 5.7% ethylene random copolymer 5.0 MFR<br>50% Exxon Mobil 3518CB metallocene polyethylene 3.5 MFR<br>20% Flint Hills P4-050F 4.0 MFR Homopolymer polypropylene |
| 11 | Skin 1 | 50% Flint Hills P4-050F 4.0 MFR Homopolymer polypropylene<br>50% NovaChem RMs-341-U(UG) octene copolymer sHDPE |
| | Core | 33% Braskem DS6D81 5.7% ethylene random copolymer 5.0 MFR<br>34% Exxon Mobil 3518CB metallocene polyethylene 3.5 MFR<br>33% Flint Hills 43S2A 3.2% ethylene random copolymer 2.0 MFR |
| | Skin 2 | 50% Flint Hills P4-050F 4.0 MFR Homopolymer polypropylene<br>50% NovaChem RMs-341-U(UG) octene copolymer sHDPE |
| 12 | Skin 1 | 50% Flint Hills P4-050F 4.0 MFR Homopolymer polypropylene<br>50% NovaChem RMs-341-U(UG) octene copolymer sHDPE |
| | Core | 33% Braskem DS6D81 5.7% ethylene random copolymer 5.0 MFR<br>34% Exxon Mobil 3518CB metallocene polyethylene 3.5 MFR<br>33% Flint Hills 43S2A 3.2% ethylene random copolymer 2.0 MFR |
| | Skin 2 | 50% Flint Hills P4-050F 4.0 MFR Homopolymer polypropylene<br>50% NovaChem RMs-341-U(UG) octene copolymer sHDPE |
| 13 | Skin 1 | 95% Exxon Mobil PP7032KN Impact Copolymer<br>5% A Schulman ABVT22SC Antiblock |
| | Core | 33% Braskem DS6D81 5.7% ethylene random copolymer 5.0 MFR<br>34% Exxon Mobil 3518CB metallocene polyethylene 3.5 MFR<br>33% Flint Hills 43S2A 3.2% ethylene random copolymer 2.0 MFR |
| | Skin 2 | 95% Exxon Mobil PP7032KN Impact Copolymer<br>5% Ampacet 401960 Seablock 4 Antiblock |
| 14 | Skin 1 | 45% Exxon Mobil PP7032KN Impact Copolymer<br>35% Total Petrochemicals 8473 4.0% ethylene random copolymer 4.6 MFR<br>15% Exxon Mobil 3518CB metallocene polyethylene 3.5 MFR<br>5% A Schulman ABVT22SC Antiblock |
| | Core | 33% Total Petrochemicals 8473 4.0% ethylene random copolymer 4.6 MFR<br>34% Exxon Mobil 3518CB metallocene polyethylene 3.5 MFR<br>33% Flint Hills 43S2A 3.2% ethylene random copolymer 2.0 MFR |
| | Skin 2 | 45% Exxon Mobil PP7032KN Impact Copolymer<br>35% Total Petrochemicals 8473 4.0% ethylene random copolymer 4.6 MFR<br>15% Exxon Mobil 3518CB metallocene polyethylene 3.5 MFR<br>5% Ampacet 401960 Seablock 4 Antiblock |
| 15 | Skin | 80% Lydondell Basell 5C30F terpolymer 5.5 MFR<br>15% Exxon Mobil 3518CB metallocene polyethylene 3.5 MFR<br>5% Ampacet 401960 Seablock 4 Antiblock |
| | Core | 95% Braskem DS6D81 5.7% ethylene random copolymer 5.0 MFR<br>5% Exxon Mobil 3518CB metallocene polyethylene 3.5 MFR |
| | Skin 2 | 45% Lydondell Basell 5C30F terpolymer 5.5 MFR<br>50% Exxon Mobil 3518CB metallocene polyethylene 3.5 MFR<br>Ampacet 401960 Seablock 4 Antiblock |
| 16 | Skin1 | 80% Lydondell Basell 5C30F terpolymer 5.5 MFR<br>15% Exxon Mobil 3518CB metallocene polyethylene 3.5 MFR<br>5% Ampacet 401960 Seablock 4 Antiblock |
| | Core | 95% Lydondell Basell 5C30F terpolymer 5.5 MFR<br>5% Exxon Mobil 3518CB metallocene polyethylene 3.5 MFR |
| | Skin 2 | 45% Lydondell Basell 5C30F terpolymer 5.5 MFR<br>50% Exxon Mobil 3518CB metallocene polyethylene 3.5 MFR<br>5% Ampacet 401960 Seablock 4 Antiblock |

Given that labeled articles, including labeled bottles, may be conveyed on high speed lines with metal rails or metal rails lined with HDPE, an enhanced scuff resistance is desirable. The friction of the walls encountered by the labeled article may cause surface defects, including scratches or scuff marks, which are aesthetically displeasing and undesirable in a labeled article. In certain applications, clear labels with low haze may be desired for aesthetic reasons, e.g. a "no-label look" in which the label is hard to detect visually by the human eye when attached to a bottle. In the past, HDPE and LDPE containers with a certain level of haze were used. Current trends are favoring PET bottles, which are clear, and accordingly, a clearer label may be required to arrive at the same "no-label look". The below table denotes several films for comparison along with the scratching results as obtained from the Sutherland rub test, where the number of scratches are inversely proportional to the scratch resistance.

TABLE 2

Haze and Scratch Resistance Measurement

| Product | Haze | Number of Scratches: Modified Sutherland Rub |
|---|---|---|
| Avery Global Coex (MDO film) | 40 | 24 |
| Avery Global MDO (MDO film) | 22 | 27 |
| Avery Fasclear 250 (MDO film) | 55 | 38 |
| Example 8 (MDO film) | 11 | 15 |
| Example 9 (MDO film) | 18 | 10 |
| Example 15 | 4 | 12 |
| Example 16 | 4 | 8 |
| Avery PE 85 | 22 | 18 |
| Avery 2.0 mil BOPP | 4 | 8 |
| Raflatac Raflex Plus | 5 | 9 |

The above data shows that the films of Examples 8 and 9 have achieved a relatively higher level of scuff resistance and a relatively lower level of haze as compared to the previous MDO films (i.e. —Global Coex (GCX), Global MDO, Fasclear 250). Additionally, the films of Examples 8 and 9 demonstrate a more desirable combination of scuff resistance and scratch resistance than a blown PE film (Avery PE 85). Examples 8 and 9 utilize higher levels of polyethylene relative to (GCX and Global MDO) yet still demonstrate increased scuff resistance. Previous experimentation has demonstrated an inverse relationship between polyethylene levels and scuff resistance; accordingly, the performance of Examples 8 and 9 are unexpected results.

Another aspect of the films is in regards to MD stiffness vs. CD stiffness ratio. Normally, an MDO film is stretched in one direction (the machine direction) and results in a film having a high MD stiffness and a lower CD stiffness. Without stretching in the CD, one would normally be confined to whatever was obtained as an output for the CD stiffness. In the new formulas above, including Examples 8 and 9, the CD stiffness may be manipulated by varying the composition of the film. Such formulation enables a film that has more balanced properties for an MDO film without the use of mechanical means to stretch the film in the CD. Accordingly, it is possible to create a label that is conformable yet does not "fold" in the CD; again an unexpected result. A MD/CD stiffness ratio of 1.0 describes an ideally balanced sheet. These new formulas approach that ideality and solve a unique problem of the inherent tradeoff between stiffness, conformability, and clarity in an MDO film and may result in desirable end use benefits including enhanced decoration technology convertibility, use in health and personal care applications, to enable better, recyclability, barrier properties, steam sterilization, durable labels, pharmaceuticals, blood bags, fresh bottle labeling, and tube applications, as well as improved aesthetics attributable to metallization or printing with metallic inks. As shown in Table 3, the ratio of MD stiffness to CD stiffness for the disclosed labels may range from 1.2-1.9. More specifically, the ratio may range from 1.24 to 1.89.

TABLE 3

Stiffness Measurement

| Material | MD L&W (mN) | CD L&W (mN) | MD/CD Ratio |
| --- | --- | --- | --- |
| Avery Global Coex (GCX) | 44 | 19 | 2.32 |
| Avery Global MDO | 28 | 11 | 2.55 |
| Avery Fasclear 250 | 29 | 14 | 2.07 |
| Example 1 | 23 | 16 | 1.43 |
| Example 7 | 53 | 28 | 1.89 |
| Example 8 | 30 | 24 | 1.25 |
| Example 9 | 28 | 22 | 1.27 |
| Example 14 | 28 | 23 | 1.24 |
| Example 15 | 48 | 35 | 1.38 |
| Example 16 | 20 | 23 | 0.87 |
| Avery PE 85 | 38 | 53 | 0.72 |
| Avery 2.0 mil BOPP | 29 | 51 | 0.57 |
| Raflatac Raflex Plus | 42 | 37 | 1.13 |

Another physical attribute of labels is referred to as conformability, which dictates the amount of "squeeze" a user can apply to a bottle before the label wrinkles and darts and other such defects are formed. During application to a bottle, a more conformable film also allows for fewer defects attributable to adhesive wet out, bottle movements, and other such real life phenomena when a bottle is labeled and contents are applied (expanding the bottle expand entry/ filling of material into the empty bottle and subsequent emptying).

A paradigm that has existed is the more conformable labels (PE films or MDO films), tend to have a low modulus in MD and CD (conformable), but also have a high haze. The BOPP films are clear, but have a high modulus (are rigid and therefore not conformable). As such, a film that is both conformable and exhibits low haze is desirable. In these tables, PE 85, Fasclear 250, and Example 8 and 9 are considered fully conformable. Global Coex and Global MDO are considered semi conformable, and BOPP is considered rigid (i.e. not conformable).

TABLE 4

Conformability and Haze Measurement

| Material | 2% Secant Modulus MD (psi) | 2% Secant Modulus CD (psi) | MD/CD Ratio | Haze |
| --- | --- | --- | --- | --- |
| Avery Global Coex (GCX) | 191,000 | 84,000 | 2.27 | 40 |
| Avery Global MDO | 243,000 | 114,000 | 2.14 | 22 |
| Avery Fasclear 250 | 144,000 | 75,000 | 1.92 | 55 |
| Example 8 | 115,000 | 66,000 | 1.74 | 11 |
| Example 9 | 124,000 | 61,000 | 2.03 | 18 |
| Example 15 | 120,623 | 79,086 | 1.52 | 4 |
| Example 16 | 103,657 | 74,509 | 1.39 | 4 |
| Avery PE 85 | 83,000 | 106,000 | 0.78 | 22 |
| Avery 2.0 mil BOPP | 226,000 | 339,000 | 0.67 | 4 |
| Raflatac Raflex Plus | 275,000 | 256,000 | 1.07 | 5 |

As label converting technology continues to evolve, an additional method for converting labels, in addition to the traditional methods of metal anvil and mag die cutting, is use of lasers for conversion. Typical lasers utilized in label converting operate at wavelengths of 10.2 and 10.6 micrometers (near infrared wavelengths), although other wavelengths may also be used. Lasers with these wavelengths may be used for cutting labels with layers including one or more materials such as BOPP (both clear and white), PE (both clear and white), paper, PET (both clear and white), and MDO films, again both clear and white. Of note, each of these materials (and/or additives contained therein) absorb light in the wavelengths emitted by the conventional lasers described previously. In general, the white films and paper are properly die cutting, i.e., such materials absorb light of at least one of 10.2 and 10.6 micrometer wavelength and result in a label cut from a matrix; for purposes of this application, such materials are referred to "laser die cuttable". However, PE films do not currently laser die cut well and present a problem to the label industry for those wishing to have a conformable film that also die cuts given its ability to absorb laser light. One would naturally anticipate a laser to die cut well on films that fit the criteria of 1) low melting point and 2) being of a construction in which the laser will be absorbed by the material. In regards to laser die cutting of MDO films, commercially available Fasclear films from Avery Dennison fit the criteria one would anticipate for laser die cutting, but these films are not optically clear, further restricting the selection of labels.

Contrary to what would be expected by one of ordinary skill in the art, it has been found that clear MDO labels that were conformable could be laser die cut. Such performance is unexpected because the melting points of the polymers are actually higher than those previously demonstrated to be laser cuttable, and the materials are not in the absorption band on the laser.

TABLE 5

Laser Cutting Performance of Selected Films

| Film | IR Absorption micrometers | Melting Point Average (C) | Haze (%) | Result |
|---|---|---|---|---|
| Avery BOPP | 10.3 | 142 | 4 | Cut |
| Avery PE 85 | 8 | 100 | 25 | Not Cut |
| Avery Global MDO | 12 | 132 | 22 | Not Cut |
| Avery Fasclear | 10.6 | 92 | 55 | Cut |
| Example 8 | 7.2 | 112 | 11 | Cut |
| Example 9 | 7.4 | 128 | 18 | Cut |

In addition to the enhanced durability and laser cuttability of the subject films are enhancements to ink adhesion and ink cure time on the disclosed films. The speed at which an ink will cure on a film substrate determines quality (faster is better) and determines press time. In other words, the faster an ink cures on a given substrate (e.g. label), the faster the press can run, thereby increasing efficiency and productivity of the printing asset. In many instances, a converter is required to balance ink adhesion performance with press speed, as there is a demonstrated inverse relationship between ink adhesion performance and press speed. As a means for avoiding the tradeoff between ink adhesion and press speed, inherently printable films (i.e., films without a coating, whether a topcoat or a print primer) have been developed; alternatively, a print primer or a topcoat may be deposited on the surface of the labelstock to be printed. Naturally, deposition of a topcoat or primer increases ink adhesion performance, but additional of this material to the labelstock also increases the cost of the label construction. In view of ever-increasing food contact regulations, industrial drive toward sustainability, and cost reasons, it is desired to obtain enhanced ink adhesion performance without the additional cost and time attributable to top-coating a labelstock.

It is recognized in the art that a combination of resin formula and surface treatment can achieve a desired print/ink adhesion result, whether the treatment be corona, plasma, or flame treatment or flame plasma treatment. In one instance, the film may be flame or flame plasma treated from 1800-2500 btu/in using a ratio of fuel to oxygen between 40:60 and 60:40. As a technology, surface treatment results in an increase in dyne level of the surface of the labelstock, and a corresponding increase in ink adhesion is the result. However, what is unexpected and found through print testing is that the cure rate of the ink is increased. With this unexpected result, the benefit is that a printer converter can run faster and still obtain the same ink adhesion by application of the enhanced surface treatment. Such increase in curing rate results in an ability to run a printing asset at a higher rate, thereby increasing productivity and efficiency and in turn decreasing cost per unit area.

The data in Table 6 are taken following tests on a Mark Andy 4150 Printing Press running standard Flint 4 color process inkset (CMYK). The control film (Avery Fasclear) after corona treatment could run up to 325 fpm until the ink started to fail, while at 500 fpm the same film after flame treatment failed. In contrast, both Example 8 and Example 9, both achieved 100% ink adhesion after both corona treatment with press speed of 325 fpm and with flame treatment at 500 fpm.

TABLE 6

Ink Adhesion Performance of Selected Films

| Film | Treatment Type | Max Press Speed | Ink Adhesion |
|---|---|---|---|
| Avery Fasclear | Corona | 325 | 100% |
| Avery Fasclear | Flame | 500 | 25% |
| Example 8 | Corona | 325 | 100% |
| Example 8 | Flame | 500 | 100% |
| Example 9 | Corona | 325 | 100% |
| Example 9 | Flame | 500 | 100% |

In order to produce a film which is amenable to corona treatment, a higher number of functional polymers need to be used relative to forming a film amenable to flame or flame plasma treatment. The functional polymers which render a film amenable to corona treatment result in an overall softer, and therefore less scuff resistant, film relative to a film formulated to flame or flame plasma treatment, which contains fewer functional polymers and is therefore relatively harder and more scuff-resistant than a film prepared for subsequent corona treatment.

The films and multilayer assemblies of the present subject matter are expected to have wide application and use in numerous industries. Prime applications of the films are as filmic labels or as a decoration medium for labeling and packaging materials.

It will be appreciated that all of the illustrated multilayer films and label assemblies could include additional layers or materials. In no way is the present subject matter limited to the particular embodiments depicted.

Many other benefits will no doubt become apparent from future application and development of this technology.

All patents, published applications, and articles noted herein are hereby incorporated by reference in their entirety.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A multilayer film comprising:
   a core layer comprising a blend comprising:
   (i) a first polymeric material selected from the group consisting of a polyethylene (PE) homopolymer, an alpha polyolefin, a PE-containing copolymer, and combinations thereof;
   (ii) at least one polypropylene (PP)-containing material selected from the group consisting of a PP homopolymer, a PP-containing copolymer, and combinations thereof,
   a first and a second skin layer, wherein the core layer is disposed between the first and second skin layer, and wherein a composition of the core layer is different from a composition of at least one of the first skin layer and the second skin layer,
   wherein the film exhibits a ratio of stiffness in a machine direction to a cross direction of between 0.87:1 and 1.38:1, and
   wherein the film is machine direction oriented only.

2. The film of claim 1 wherein the first polymeric material is a PE selected from the group consisting of linear low density polyethylene (LLDPE), low density polyethylene (LDPE), very low density polyethylene (VLDPE), high density polyethylene (HDPE), and combinations thereof.

3. The film of claim 1 wherein the first polymeric material comprises polar functionality in the first polymeric material.

4. The film of claim 1 wherein the first polymeric material comprises the alpha polyolefin.

5. The film of claim 1 wherein the (PP)-containing material is selected from the group consisting of (i) copolymers of PP and PE having a low ethylene content, (ii) copolymers of PP and PE having a high ethylene content, (iii) block copolymers of PP with one or more other monomers, (iv) PP with one or more functionalized polar groups, (v) terpolymers of PP, and combinations thereof.

6. The film of claim 1 wherein the film is oriented by hot stretching at a stretch ratio within a range of from 2:1 to 9:1.

7. The film of claim 1 wherein the PE content of the layer comprising the first polymeric material and the (PP)-containing material is from 25% to 95%.

8. The film of claim 7 wherein the PE content is from 30% to 80%.

9. The film of claim 7 wherein the PE content is from 35% to 75%.

10. The film of claim 1 wherein the layer comprising the first polymeric material and the (PP)-containing material further comprises at least one of EVA and EVA-based components.

11. The film of claim 1 wherein at least one of the first skin layer and the second skin layer comprises at least one polymeric component selected from the group consisting of polypropylene (PP), ethylene vinyl acetate (EVA), linear low density polyethylene (LLDPE), linear low density polypropylene (PP), high density polyethylene (HDPE), high density polypropylene (HDPP), styrene diblock copolymer, ionomer resins, linear low density polyethylene (LLDPE), very low density polyethylene (VLDPE), ethylene acrylic acid (EAA) copolymers, and combinations thereof.

12. The film of claim 1 wherein the composition of the core layer is different from the composition of the first skin layer or the second skin layer.

13. The film of claim 1 wherein the composition of the core layer is different from the composition of both the first skin layer and the second skin layer.

14. The film of claim 1 wherein a polymeric component of the core layer is different from a polymeric component of at least one of the first skin layer and the second skin layer.

15. The film of claim 1 wherein the first and second skin layers have different proportions of the same polymeric components.

16. The film of claim 11 wherein the first and second skin layers have equal proportions of the same polymeric components.

17. The film of claim 11 wherein the first and second skin layers have (i) the same polymeric component, and (ii) different additives.

18. The film of claim 11 wherein the first and second skin layers have (i) different polymeric component, and (ii) the same additives.

19. The film of claim 1 wherein the ratio of stiffness of the film in a machine direction to a cross direction is between 0.87:1 and 1.27:1.

20. The film of claim 1 wherein the amount of the first polymeric material is greater than the amount of the (PP)-containing material.

21. The oriented film of claim 1 wherein the film is laser die cuttable.

22. The oriented film of claim 1 wherein the film is flame treated.

23. The film of claim 1, wherein the core layer has a weight between 60 and 90% of a weight of the film and the first and the second skin layer has a weight between 10% and 40% of the weight of the film.

24. A label assembly comprising:
the multilayer film of claim 1; and
a layer of an adhesive.

25. The label assembly of claim 24 wherein the adhesive is a pressure sensitive adhesive.

26. The label assembly of claim 24 wherein the label assembly is laser die cuttable.

27. The label assembly of claim 24 wherein the label assembly is flame treated.

28. A method of producing a labeled article, the method comprising:
providing an article having a surface to receive a label assembly;
providing the label assembly comprising the film of claim 1 and an adhesive layer;
adhering the layer of the adhesive of the label assembly to the surface of the article to thereby produce a labeled article.

29. A multilayer film comprising:
a core layer comprising a blend comprising:
(i) a first polymeric material selected from the group consisting of a polyethylene (PE) homopolymer, an alpha polyolefin, a PE-containing copolymer, and combinations thereof;
(ii) at least one polypropylene (PP)-containing material selected from the group consisting of a PP homopolymer, a PP-containing copolymer, and combinations thereof,
a first and a second skin layer, wherein the core layer is disposed between the first and second skin layer, and
wherein a polymeric component of the core layer is the same as a polymeric component of at least one of the first skin layer and the second skin layer,
wherein the film exhibits a ratio of stiffness in a machine direction to a cross direction of between 0.87:1 and 1.38:1, and
wherein the film is machine direction oriented only.

30. The film of claim 29 wherein the film ratio of stiffness in a machine direction to a cross direction is between 0.87:1 and 1.27:1.

31. The film of claim 29 wherein the first and second layers have the same polymeric components.

32. The film of claim 29 wherein the core layer, the first layer, and the second layer have the same polymeric components.

33. The film of claim 29 wherein the core layer, the first layer, and the second layer have equal proportions of the same polymeric components.

34. The film of claim 29 wherein the first and second layers have the same polymeric components and non-polymeric components.

35. The film of claim 29 wherein the first and second layers have (i) the same polymeric components and non-polymeric components, and (ii) different proportions of the polymeric components.

36. The film of claim 29 wherein the first and second layers have different proportions of the same polymeric components.

* * * * *